United States Patent
Tang et al.

(10) Patent No.: US 9,136,766 B2
(45) Date of Patent: Sep. 15, 2015

(54) SWITCHING POWER CONVERTING APPARATUS

(71) Applicant: RICHTEK TECHNOLOGY CORP., Hsinchu (TW)

(72) Inventors: Chien-Fu Tang, Hsinchu (TW); Tzu-Chen Lin, Changhua County (TW); Isaac Y. Chen, Zhubei (TW)

(73) Assignee: RICHTEK TECHNOLOGY CORP., Hsinchu (TW)

( * ) Notice: Subject to any disclaimer, the term of this patent is extended or adjusted under 35 U.S.C. 154(b) by 341 days.

(21) Appl. No.: 13/896,631

(22) Filed: May 17, 2013

(65) Prior Publication Data

US 2014/0192564 A1   Jul. 10, 2014

(30) Foreign Application Priority Data

Jan. 7, 2013   (TW) .............................. 102100426 A

(51) Int. Cl.
*H02M 3/335*   (2006.01)
*H02M 1/36*   (2007.01)

(52) U.S. Cl.
CPC ...... *H02M 3/33523* (2013.01); *H02M 3/33592* (2013.01); *H02M 1/36* (2013.01); *Y02B 70/1475* (2013.01)

(58) Field of Classification Search
CPC ................... H02M 3/33523; H02M 3/33592
USPC ............................................ 363/21.12–21.18
See application file for complete search history.

(56) References Cited

U.S. PATENT DOCUMENTS

| | | | |
|---|---|---|---|
| 6,353,544 B1 * | 3/2002 | Lau | 363/21.14 |
| 6,809,939 B1 * | 10/2004 | Yang | 363/21.14 |
| 7,012,821 B1 * | 3/2006 | Park et al. | 363/21.14 |
| 7,835,163 B2 | 11/2010 | Chou | |
| 2009/0316441 A1 * | 12/2009 | Hu | 363/21.06 |

* cited by examiner

*Primary Examiner* — Jue Zhang
(74) *Attorney, Agent, or Firm* — Steven B. Philips; Moore & Van Allen PLLC

(57) ABSTRACT

A switching power converting apparatus is capable of converting an input voltage to an output voltage, and includes a transformer, a primary side control module, and a secondary side control module. The secondary side control module utilizes voltage clamping techniques or current-drawing techniques to stop self-excited conversion from the input voltage to the output voltage when the output voltage is greater than a predetermined target voltage, or utilizes a non-self-excited conversion architecture.

18 Claims, 16 Drawing Sheets

SWITCHING POWER CONVERTING APPARATUS

CROSS-REFERENCE TO RELATED APPLICATION

This application claims priority of Taiwanese Application No. 102100426, filed on Jan. 7, 2013, the contents of which are hereby incorporated by reference.

BACKGROUND OF THE INVENTION

1. Field of the Invention

This invention relates to a switching power converting apparatus, and more particularly to switching power converting apparatus with a secondary side regulation.

2. Description of the Related Art

Referring to FIG. 1, a conventional self-excited flyback switching power converting apparatus disclosed in U.S. Pat. No. 7,835,163 converts an input voltage (Vin) to an output voltage (Vout). The conventional switching power converting apparatus utilizes a controller 12 for secondary side regulation at a secondary side of a transformer 11 to control a switching device 13 at a primary side of the transformer 11, to achieve better regulation.

Referring to FIGS. 1 and 2, a circuit configuration between a first control terminal (CTL1) and a second control terminal (CTL2) in the controller 12 may be configured as one of a resistor load connection, a short circuit and an open circuit. When the output voltage (Vout) is greater than a target voltage, the controller 12 is operable to set the circuit configuration to the resistor load connection for a time period so as to stop the switching device 13 from being conducted. Therefore, self-excited conversion from the input voltage (Vin) to the output voltage (Vout) stops, such that the output voltage (Vout) is prevented from rising. When the output voltage (Vout) is smaller than the target voltage, the controller 12 is operable to set the circuit configuration to the short circuit for a time period so as to cause the switching device 13 to conduct. Therefore, the self-excited conversion starts for raising the output voltage (Vout). Otherwise, the controller 12 is operable to set the circuit configuration to the open circuit so as to avoid interfering with operation of the conventional switching power converting apparatus.

The following are some of the drawbacks of the conventional switching power converting apparatus:

1. It is hard for a designer to determine a resistance value between the first and second control terminals (CTL1, CTL2) of the controller 12 with the circuit configuration being the resistor load connection.

2. The resistance value between the first and second control terminals (CTL1, CTL2) of the controller 12 may vary in fabrication process of the controller 12, and may drift along with variation in temperature, etc.

SUMMARY OF THE INVENTION

Therefore, an object of the present invention is to provide a switching power converting apparatus that can overcome the aforesaid drawbacks associated with the prior art.

According to one aspect of this invention, a switching power converting apparatus comprises a transformer, a primary side control module, and a secondary side control module.

The transformer includes a first primary winding, a second primary winding, and a secondary winding. Each of the first and second primary windings and the secondary winding has a dot-marked terminal and a non-dot terminal.

The primary side control module includes a switching unit coupled between the non-dot terminal of the first primary winding of the transformer and the non-dot terminal of the second primary winding of the transformer.

The secondary side control module includes an output capacitor, a rectification switch unit, a zero current detecting unit, and a control unit. The output capacitor provides an output voltage thereacross. The rectification switch unit is coupled between the secondary winding of the transformer and the output capacitor. The rectification switch unit is operable in one of an OFF state, where the rectification switch unit permits current flow through the secondary winding of the transformer from the dot-marked terminal to the non-dot terminal, and an ON state, where the rectification switch unit permits current flow through the secondary winding of the transformer from the non-dot terminal to the dot-marked terminal. The zero current detecting unit is coupled to the secondary winding of the transformer for detecting a current flowing through the secondary winding of the transformer so as to output a zero current indication signal upon detecting that the current becomes zero. The control unit is coupled to the secondary winding of the transformer, the output capacitor, the rectification switch unit, and the zero current detecting unit, is configured to receive the zero current indication signal from the zero current detecting unit, and is configured to detect the output voltage across the output capacitor.

The control unit of the secondary side control module is operable to enable the rectification switch unit to operate in the ON state for a predetermined time period upon detecting that the output voltage is less than a predetermined target voltage. The control unit of the secondary side control module is further operable, upon detecting that the output voltage is greater than the predetermined target voltage and upon receipt of the zero current indication signal from the zero current detecting unit, to clamp a potential at the dot-marked terminal of the secondary winding of the transformer to be lower than that at the non-dot terminal of the secondary winding of the transformer or to draw a predetermined current from the dot-marked terminal of the secondary winding of the transformer.

According to another aspect of this invention, a switching power converting apparatus comprises a transformer, a secondary side control module, and a primary side control module.

The transformer includes a first primary winding, a second primary winding, and a secondary winding. Each of the first and second primary windings and the secondary winding has a dot-marked terminal and a non-dot terminal.

The secondary side control module includes an output capacitor, a rectification switch unit, a zero current detecting unit, and a first control unit. The output capacitor provides an output voltage thereacross. The rectification switch unit is coupled between the secondary winding of the transformer and the output capacitor. The rectification switch unit is operable in one of an OFF state, where the rectification switch unit permits current flow through the secondary winding of the transformer from the dot-marked terminal to the non-dot terminal, and an ON state, where the rectification switch unit permits current flow through the secondary winding of the transformer from the non-dot terminal to the dot-marked terminal. The zero current detecting unit is coupled to the secondary winding of the transformer for detecting a current flowing through the secondary winding of the transformer so as to output a zero-current indication signal upon detecting that the current becomes zero. The first control unit is coupled to the output capacitor, the rectification switch unit, and the zero current detecting unit, is configured to receive the zero current indication signal from the zero current detecting unit, and is configured to detect the output voltage across the output capacitor. The first control unit is operable to enable the rectification switch unit to operate in the ON state for a predetermined time period upon detecting that the output voltage is less than a predetermined target voltage and upon receipt of the zero current indication signal from the zero current detecting unit.

The primary side control module includes a switching unit and a second control unit. The second control unit is coupled to the second primary winding of the transformer and the switching unit, and is configured to detect a potential at the non-dot terminal of the second primary winding of the transformer and a current flowing through the first primary winding of the transformer. The switching unit is coupled to the non-dot terminal of the first primary winding of the transformer, and is operable in one of an ON state and an OFF state in response to a control voltage from the second control unit.

The second control unit of the primary side control module is operable to enable the switching unit to operate in the ON state upon detecting, based on the potential at the non-dot terminal of the second primary winding, one of a condition that the output voltage is less than a predetermined start voltage and the current flowing through the secondary winding of the transformer becomes zero, and a condition that the output voltage is greater than the predetermined start voltage and less than the predetermined target voltage, and enable the switching unit to operate in the OFF state upon detecting that the current flowing through the first primary winding of the transformer is greater than a predetermined target current.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
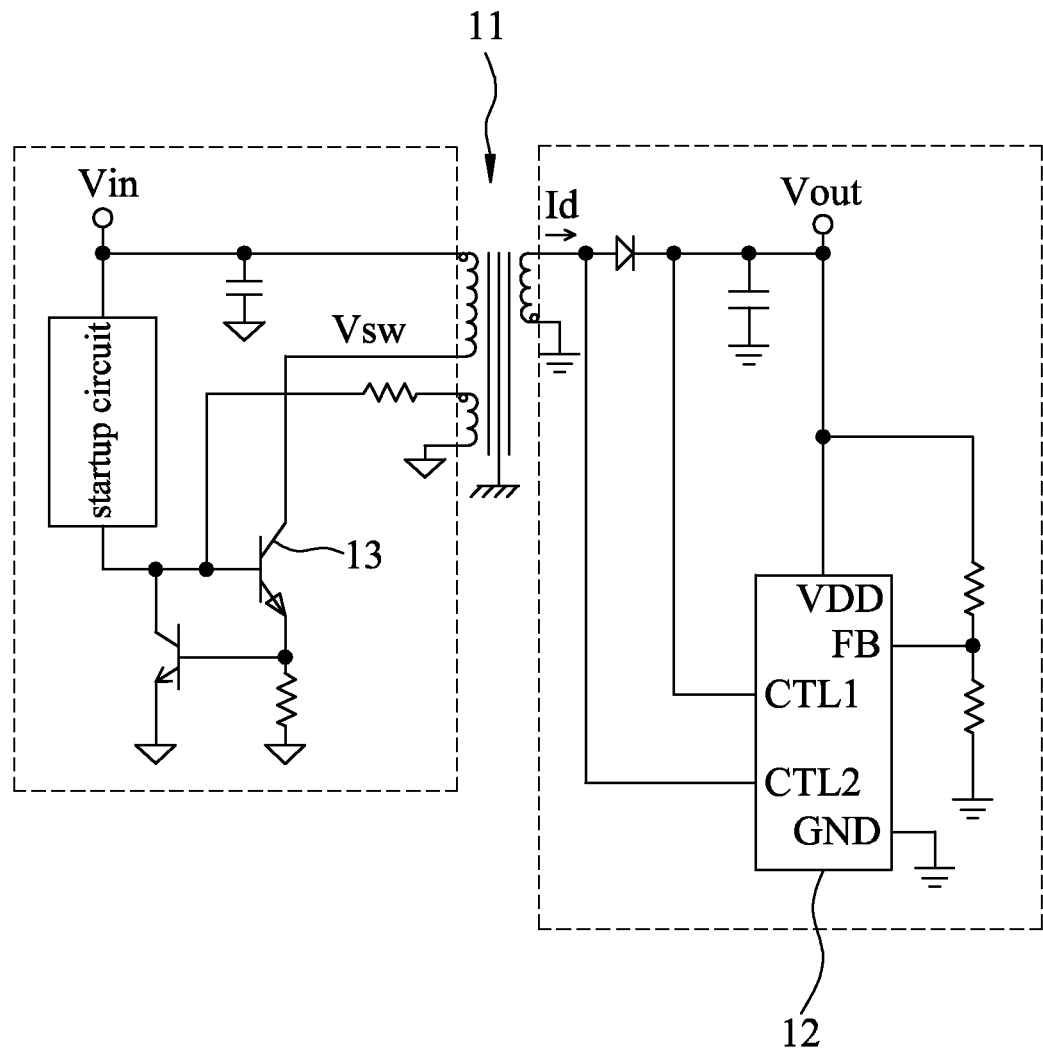
FIG. 1 is a schematic circuit block diagram illustrating a conventional self-excited flyback switching power converting apparatus.
Figure 2:
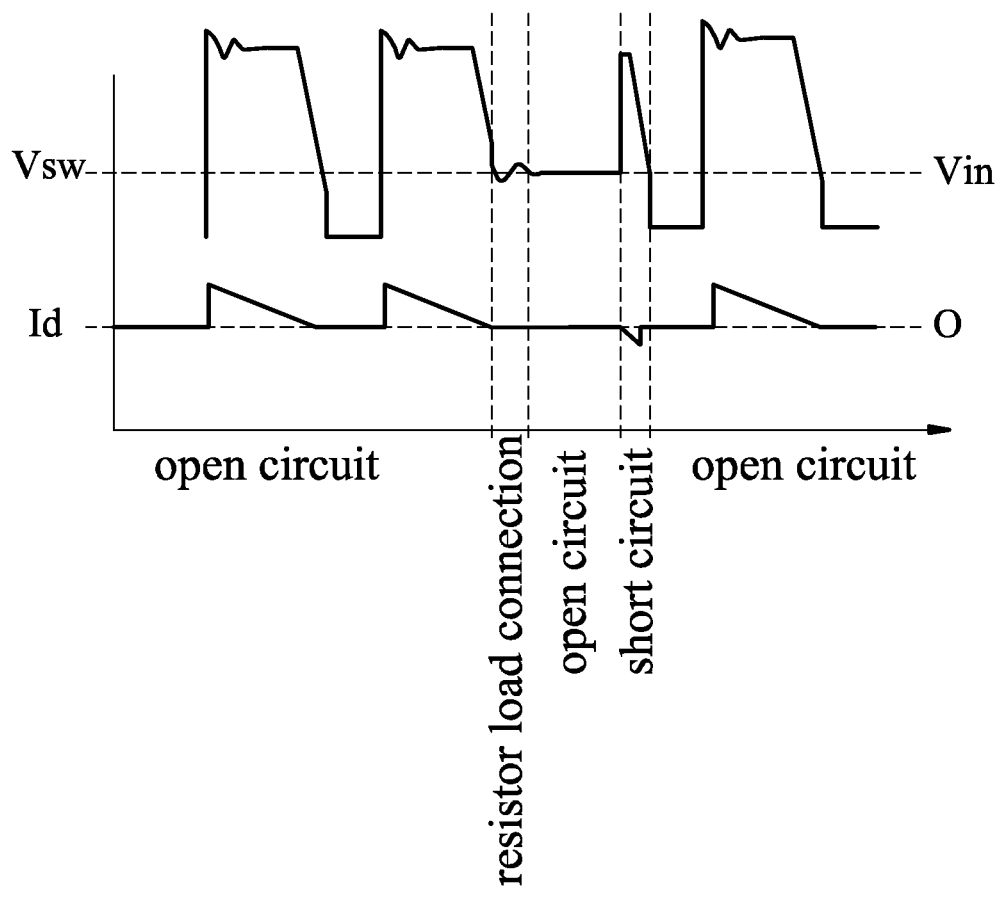
FIG. 2 is a timing diagram of wave forms of voltage (Vsw) at a primary side and current (Id) at a secondary side in the conventional switching power converting apparatus, respectively.
Figure 3:
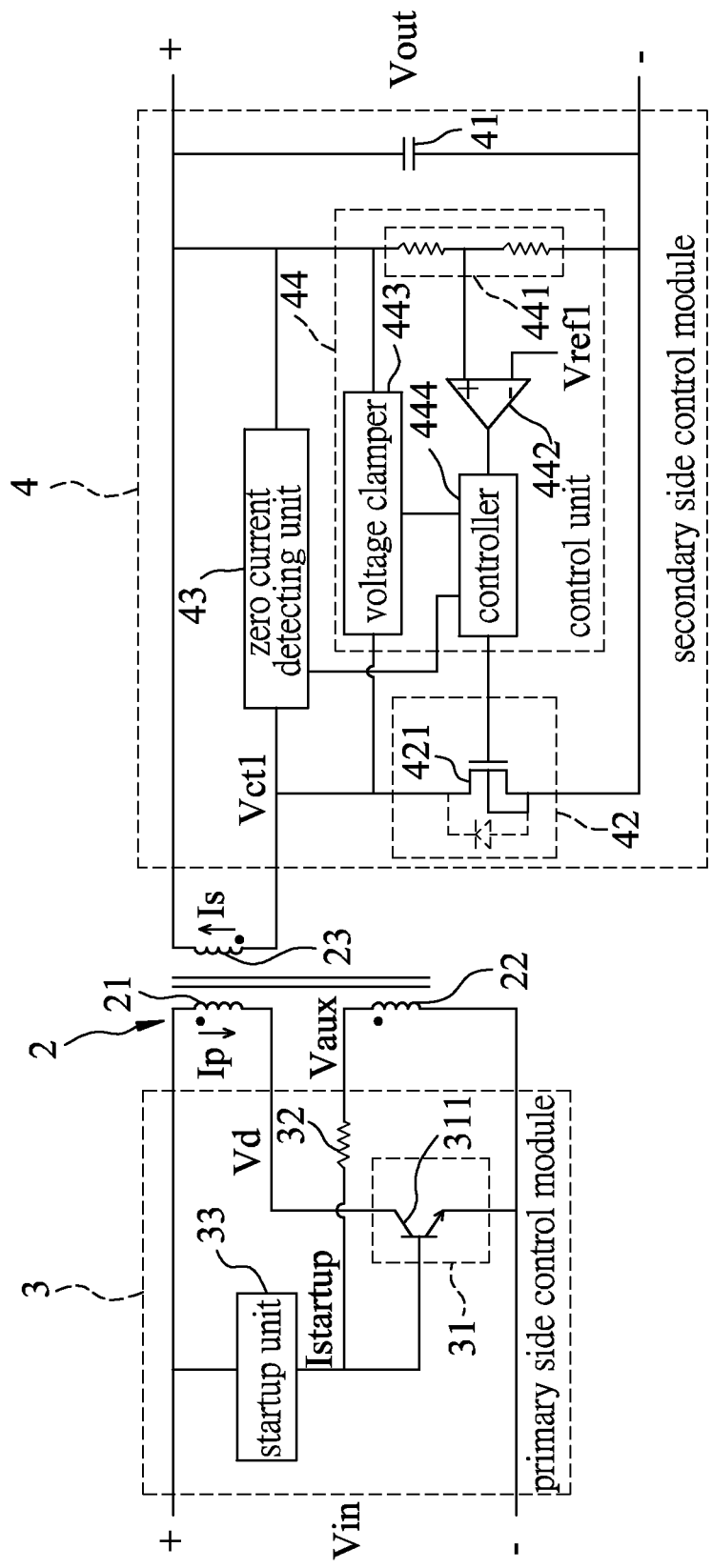
FIG. 3 is a schematic circuit block diagram illustrating the first preferred embodiment of a switching power converting apparatus according to this invention.

Referring to FIG. 3, the first preferred embodiment of a switching power converting apparatus according to this invention is a self-excited flyback switching power converting apparatus with secondary side regulation. The switching power converting apparatus of this embodiment includes a transformer 2, a primary side control module 3, and a secondary side control module 4.

The transformer 2 includes a first primary winding 21, a second primary winding 22, and a secondary winding 23. Each of the first and second primary windings 21, 22 and the secondary winding 23 has a dot-marked terminal and a non-dot terminal. The dot-marked terminal of the first primary winding 21 is configured to receive an input voltage (Vin).

The primary side control module 3 includes a switching unit 31 coupled between the non-dot terminal of the first primary winding 21 of the transformer 2 and the non-dot terminal of the second primary winding 22 of the transformer 2. The switching unit 31 is switchable between an ON state and an OFF state according to a potential (Vaux) at the dot-marked terminal of the second primary winding 22 of the transformer 2. The switching unit 31 permits a current (Ip) to flow through the first primary winding 21 of the transformer 2 in the ON state.

In this embodiment, the switching unit 31 of the primary side control module 3 includes a first bipolar junction transistor (BJT) 311 that has a base, a collector coupled to the non-dot terminal of the first primary winding 21 of the transformer 2, and an emitter coupled to the non-dot terminal of the second primary winding 22 of the transformer 2. Conduction of the first BJT 311 causes the switching unit 31 to be in the ON state. Non-conduction of the first BJT 311 causes the switching unit 31 to be in the OFF state. The primary side control module 3 further includes a first resistor 32 and a startup unit 33. The first resistor 32 is coupled between the dot-marked terminal of the second primary winding 22 of the transformer 2 and the base of the first BJT 311. The startup unit 33 is coupled between the dot-marked terminal of the first primary winding 21 of the transformer 2 and the base of the first BJT 311. The startup unit 33 is operable to output a startup current pulse (Istartup) to enable the first BJT 311 to conduct when the input voltage (Vin) rises to a predetermined voltage level.

The secondary side control module 4 includes an output capacitor 41, a rectification switch unit 42, a zero current detecting unit 43, and a control unit 44. The output capacitor 41 provides an output voltage (Vout) thereacross. The rectification switch unit 42 is coupled between the secondary winding 23 of the transformer 2 and the output capacitor 41. The rectification switch unit 42 is switchable between an OFF state, where the rectification switch unit 42 permits current flow through the secondary winding 23 of the transformer 2 from its dot-marked terminal to its non-dot terminal, and an ON state, where the rectification switch unit 42 permits current flow through the secondary winding 23 of the transformer 2 from its non-dot terminal to its dot-marked terminal. The zero current detecting unit 43 is coupled to the secondary winding 23 of the transformer 2 for detecting a current (Is) flowing through the secondary winding 23 of the transformer 2 so as to output a zero current indication signal upon detecting that the current (Is) becomes zero. The control unit 44 is coupled to the secondary winding 23 of the transformer 2, the output capacitor 41, the rectification switch unit 42, and the zero current detecting unit 43. The control unit 44 receives the zero current indication signal from the zero current detecting unit 43, and detects the output voltage (Vout) across the output capacitor 41. The control unit 43 is operable to enable the rectification switch unit 42 to operate in the ON state for a predetermined time period upon detecting that the output voltage (Vout) is less than a predetermined target voltage (Vtarget) (see FIG. 4). In this embodiment, the control unit 42 is further operable to clamp a potential (Vctl) at the dot-marked terminal of the secondary winding 23 of the transformer 2 to be lower than a potential at the non-dot terminal of the secondary winding 23 of the transformer 2 for a predetermined time period upon detecting that the output voltage (Vout) is greater than the predetermined target voltage (Vtarget) and upon receipt of the zero current indication signal from the zero current detecting unit 43.

In this embodiment, the output capacitor 41 has a first terminal coupled to the non-dot terminal of the secondary winding 23 of the transformer 2, and a second terminal.

In this embodiment, the rectification switch unit 42 includes an N-type metal-oxide-semiconductor field effect transistor (MOSFET) 421 that has a gate coupled to the control unit 44, a drain coupled to the dot-marked terminal of the secondary winding 23 of the transformer 2, a source coupled to the second terminal of the output capacitor 41, and a bulk coupled to its source. Conduction of the N-type MOSFET 421 causes the rectification switch unit 42 to be in the ON state. Non-conduction of the N-type MOSFET 421 causes the rectification switch unit 42 to be in the OFF state. When the N-type MOSFET 421 conducts, a channel formed between the drain and source of the N-type MOSFET 421 permits current flow from the secondary winding 23 of the transformer 2 to the output capacitor 41 therethrough. When the N-type MOSFET 421 does not conduct, a parasitic diode formed between the bulk and drain of the N-type MOSFET 421 permits current flow from the output capacitor 41 to the secondary winding 23 of the transformer 2 therethrough. Of course, in other embodiments, the rectification switch unit 42 can further include a diode (not shown) coupled in parallel to the N-type MOSFET 421 to cooperate with the parasitic diode of the N-type MOSFET 421 for current transmission.

In this embodiment, the zero current detecting unit 43 is coupled across the secondary winding 23 of the transformer 2. The zero current detecting unit 43 detects the current (Is) according to the potential (Vctl) at the dot-marked terminal of the secondary winding 23 and the potential at the non-dot terminal of the secondary winding 23, i.e., the output voltage (Vout) provided by the output capacitor 41. When the current (Is) becomes zero, the potential (Vctl) rises from a voltage level less than the potential (Vout) to another voltage level greater than the potential (Vout). Therefore, the zero current detecting unit 43 outputs the zero current indication signal upon detecting that an absolute value of a difference between the potentials (Vctl, Vout), i.e., |Vctl−Vout|, is less than a predetermined value.

In this embodiment, the control unit 44 includes a voltage divider 441, a comparator 442, a voltage clamper 443, and a controller 444.

The voltage divider 441 is coupled in parallel to the output capacitor 41 for dividing the output voltage (Vout) across the output capacitor 41 so as to output a divided voltage corresponding to the output voltage (Vout). In this embodiment, the voltage divider 441 is, but not limited to, a resistive voltage divider consisting of two resistors.

The comparator 442 is coupled to the voltage divider 441 for comparing the divided voltage from the voltage divider 441 with a first reference voltage (Vref1) corresponding to the predetermined target voltage (Vtarget) so as to output a comparison signal based on a comparison result of comparison thus made. In particular, a proportion of the divided voltage to the output voltage (Vout) is equal to a proportion of the first reference voltage (Vref1) to the predetermined target voltage (Vtarget), such that if the divided voltage is less than the first reference voltage (Vref1), the output voltage (Vout) is less than the predetermined target voltage (Vtarget), and if the divided voltage is greater than the first reference voltage (Vref1), the output voltage (Vout) is greater than the predetermined target voltage (Vtarget).

The voltage clamper 443 is coupled across the secondary winding 23 of the transformer 2, and is operable to clamp the potential (Vctl) to be lower than the potential (Vout).

The controller 444 is coupled to the gate of the N-type MOSFET 421 of the rectification switch unit 42, the zero current detecting unit 43, the comparator 442, and the voltage clamper 443. The controller 444 receives the zero current indication signal from the zero current detecting unit 43 and the comparison signal from the comparator 442, and controls the N-type MOSFET 421 of the rectification switch unit 42 and the voltage clamper 443. When the comparison signal indicates that the divided voltage is less than the first reference voltage (Vref1), i.e., the output voltage (Vout) is less than the predetermined target voltage (Vtarget), the controller 444 is operable, based on the comparison signal, to enable the N-type MOSFET 421 of the rectification switch unit 42 to conduct, i.e., the rectification switch unit 42 being in the ON state, for the predetermined time period. When the comparison signal indicates that the divided voltage is greater than the first reference voltage (Vref1), i.e., the output voltage (Vout) is greater than the predetermined target voltage (Vtarget), while the controller 444 receives the zero current indication signal from the zero current detecting unit 43, the controller 444 is further operable, based on the comparison signal, to enable the voltage clamper 443 to clamp the potential (Vctl) to be lower than the potential (Vout) for a while.

Figure 4:
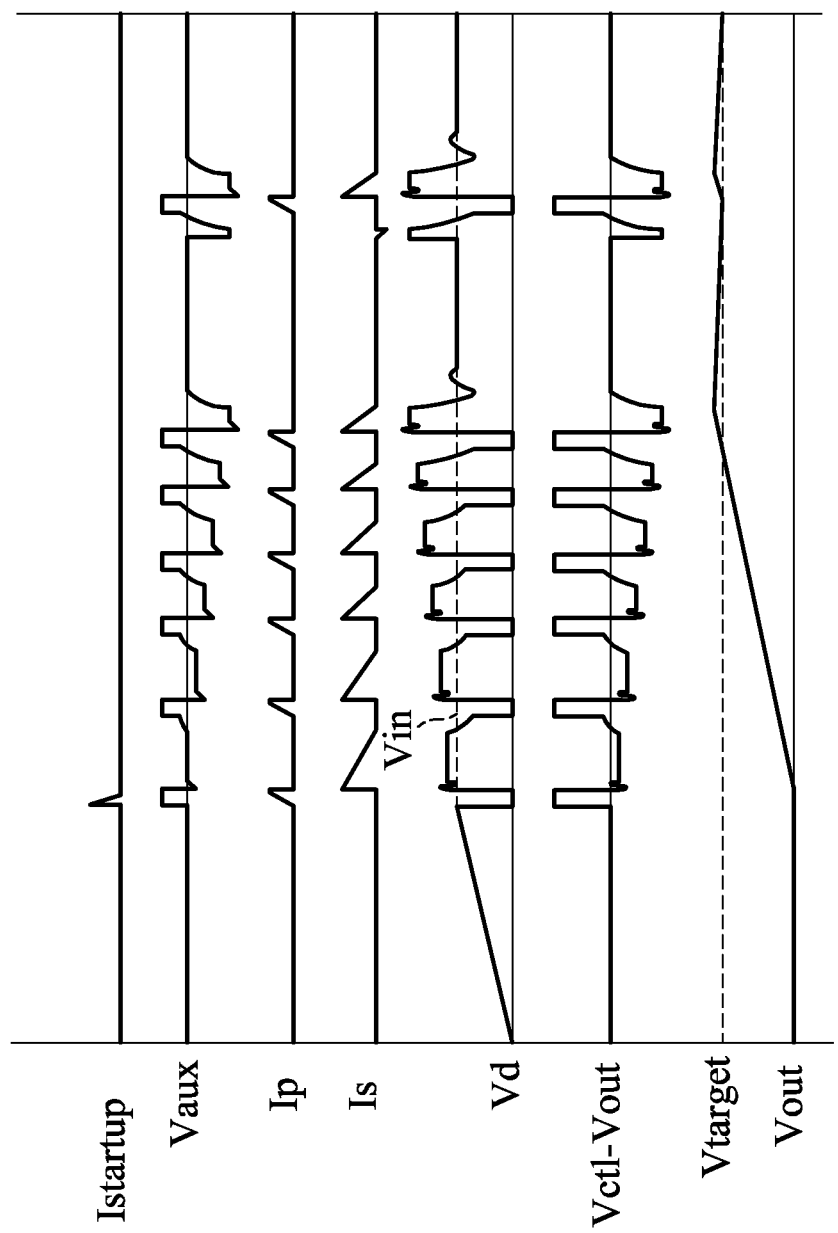
FIG. 4 is a timing diagram for illustrating operation of the switching power converting apparatus of the first preferred embodiment.

Referring to FIGS. 3 and 4, operations of the switching power converting apparatus of this embodiment are described below. First, when the input voltage (Vin) rises to the predetermined voltage level, the startup unit 33 outputs the startup current pulse (Istartup) to enable the first BJT 311 of the switching unit 31 to conduct, i.e., the ON state. Therefore, the current (Ip) begins to flow through the first primary winding 21 of the transformer 2, and rises gradually.

Next, the first BJT 311 of the switching unit 31 becomes non-conducting, i.e., the OFF state, when the current (Ip) meets the following condition:

$$Ip > \beta \times Ib$$

where β is a common-emitter current gain of the first BJT 311, and Ib is a base current of the first BJT 311. At this time, the current (Is) begins to flow through the secondary winding 23 of the transformer 2 from its dot-marked terminal to its non-dot terminal, the output voltage (Vout) rises gradually, and the current (Is) falls gradually.

When the current (Is) becomes zero, the potential (Vctl) rises from a voltage level less than the potential (Vout) to another voltage level greater than the potential (Vout), and the potential (Vaux) rises to a voltage level sufficient to enable the first BJT 311 to conduct. Accordingly, the current (Ip) begins to flow through the first primary winding 21 of the transformer 2, and rises gradually.

The aforesaid switching operation of the first BJT 311 between conduction and non-conduction proceeds repeatedly such that the output voltage (Vout) keeps on rising.

When the output voltage (Vout) is greater than the predetermined target voltage (Vtarget) while the current (Is) becomes zero, the controller 444 is operable to enable the voltage clamper 443 to clamp the potential (Vctl) to be lower than the potential (Vout) for a while, such that the potential (Vaux) does not rise to a voltage level that is sufficient to enable the first BJT 311 to conduct. Therefore, the switching operation of the first BJT 311 between conduction and non-conduction stops, and the output voltage (Vout) stops rising.

Next, when the output voltage (Vout) is less than the predetermined target voltage (Vtarget), the controller 444 is operable to enable the N-type MOSFET 421 of the rectification switch unit 42 to conduct, i.e., the ON state, for the predetermined time period. Accordingly, the current (Is) begins to flow through the secondary winding 23 of the transformer 2 from its non-dot terminal to its dot-marked terminal, and the potential (Vctl) is less than the potential (Vout).

Next, when the N-type MOSFET 421 of the rectification switch unit 42 does not conduct, i.e., the OFF state, the potential (Vctl) rises from a voltage level less than the potential (Vout) to another voltage level greater than the potential (Vout), and the potential (Vaux) rises to a level sufficient to enable the first BJT 311 to conduct. Therefore, the current (Ip) begins to flow through the first primary winding 21 of the transformer 2, and rises gradually.

When the current (Ip) meets the above condition, the first BJT 311 becomes non-conducting. Accordingly, the current (Is) begins to flow through the secondary winding 23 of the transformer 2 from its dot-marked terminal to its non-dot terminal, the output voltage (Vout) rises, and the current (Is) falls gradually.

Then, when the output voltage (Vout) is greater than the predetermined target voltage (Vtarget) while the current (Is) becomes zero, the controller 444 is operable to enable the voltage clamper 443 to clamp the potential (Vctl) to be lower than the potential (Vout) for a while, such that the potential (Vaux) does not rise to a voltage level that is sufficient to enable the first BJT 311 to conduct. As a result, the switching operation of the first BJT 311 between conduction and non-conduction stops, and the output voltage (Vout) stops rising.

In view of the above, the switching power converting apparatus of this embodiment utilizes voltage clamping techniques, instead of the aforesaid resistor load connection, to stop self-excited conversion from the input voltage (Vin) to the output voltage (Vout). Therefore, since the aforesaid resistor load connection is not used in the switching power converting apparatus of this embodiment, it is not required for the switching power converting apparatus of this embodiment to determine a resistance value of the aforesaid resistor load connection. In addition, resistance value drift encountered in the aforesaid conventional switching power converting apparatus can be effectively avoided.

Figure 5:
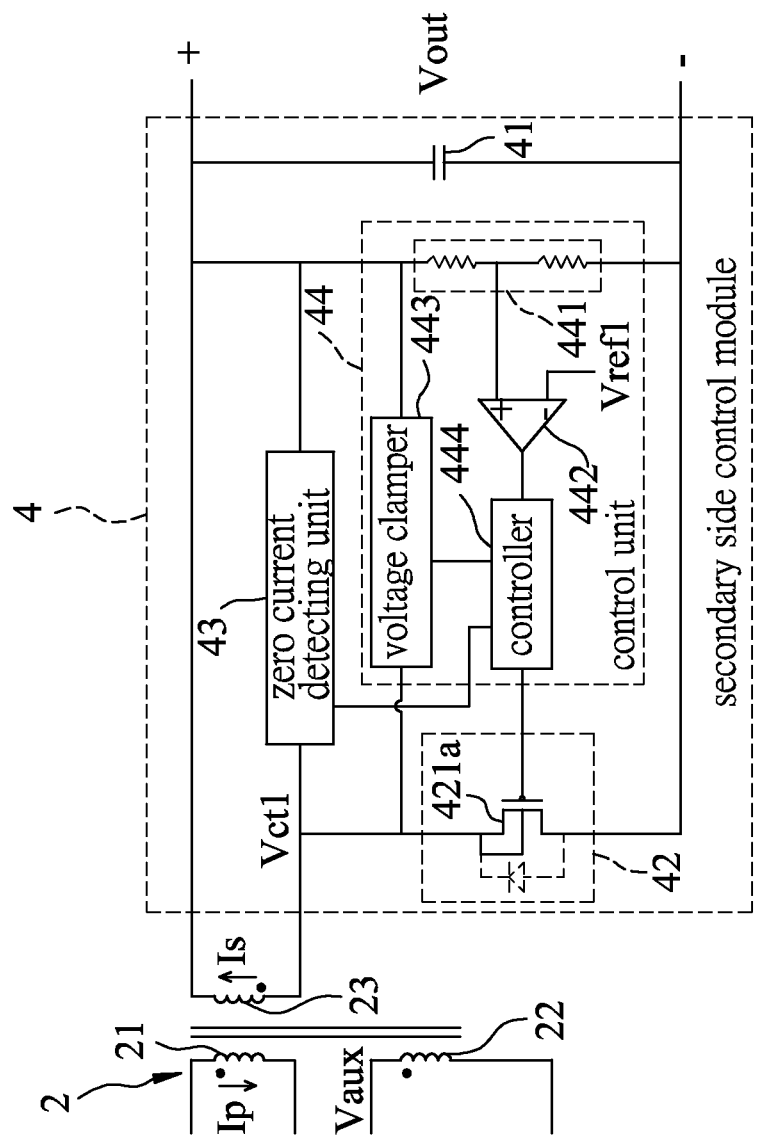
FIG. 5 is a schematic circuit block diagram illustrating a first variation of a secondary side control module of the switching power converting apparatus of the first preferred embodiment.

FIG. 5 illustrates a first variation of the secondary side control module 4. Regarding the rectification switch unit 42, a P-type MOSFET (421a) is used to replace the N-type MOSFET 421 of FIG. 3. The P-type MOSFET (421a) has a gate coupled to the controller 444, a drain coupled to the second terminal of the output capacitor 41, a source coupled to the dot-marked terminal of the secondary winding 23 of the transformer 2, and a bulk coupled to its source.

Figure 6:
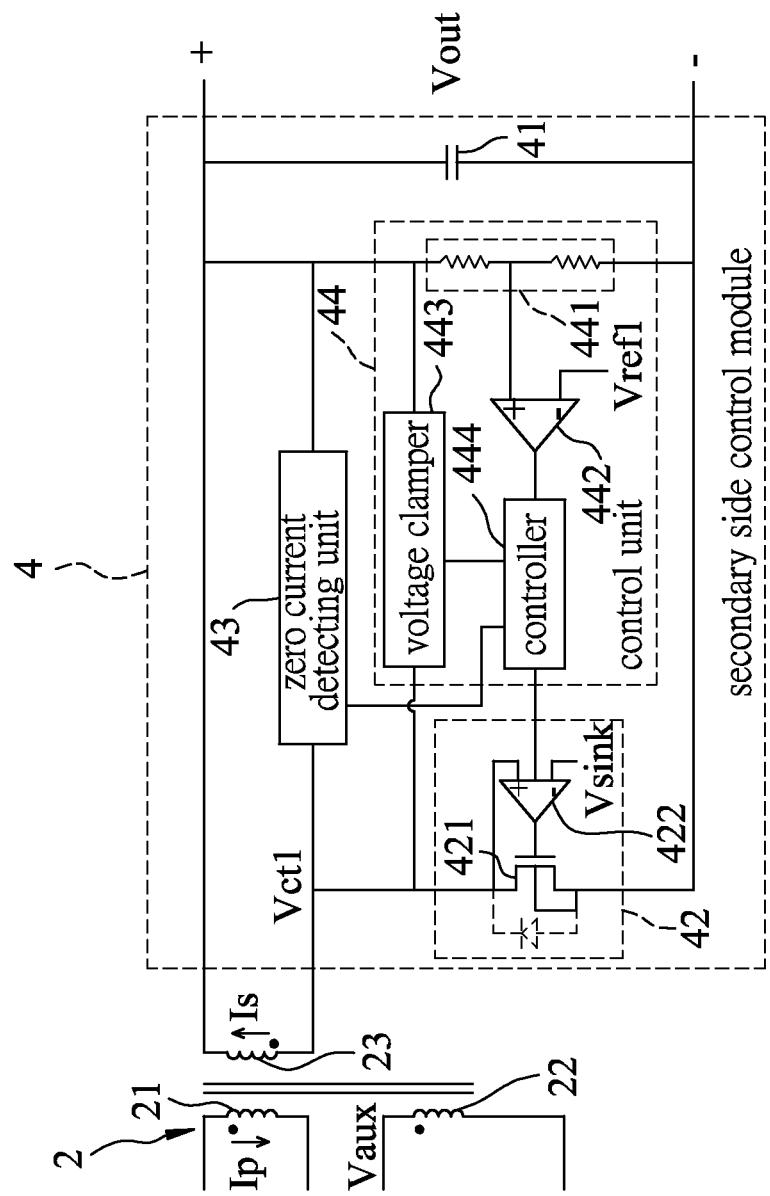
FIG. 6 is a schematic circuit block diagram illustrating a second variation of the secondary side control module of the switching power converting apparatus of the first preferred embodiment.

FIG. 6 illustrates a second variation of the secondary side control module 4. In this variation, the rectification switch unit 42 further includes an amplifier 422. The amplifier 422 has a non-inverting terminal coupled to the dot-marked terminal of the secondary winding 23 of the transformer 2, an inverting terminal adapted for receiving a sink voltage (Vsink), and an output terminal coupled to the gate of the N-type MOSFET 421. In this variation, the sink voltage (Vsink) is less than the output voltage (Vout). In addition, the controller 444 is coupled to the amplifier 422, and is operable to enable and disable the amplifier 422. When the amplifier 422 is enabled by the controller 444, the N-type MOSFET 421 conducts, the potential (Vctl) is reduced to the sink voltage (Vsink), and the current (Is) begins to flow through the secondary winding 23 of the transformer 2 from its non-dot terminal to its dot-marked terminal. When the amplifier 422 is disabled by the controller 444, the N-type MOSFET 421 does not conduct.

Figure 7:
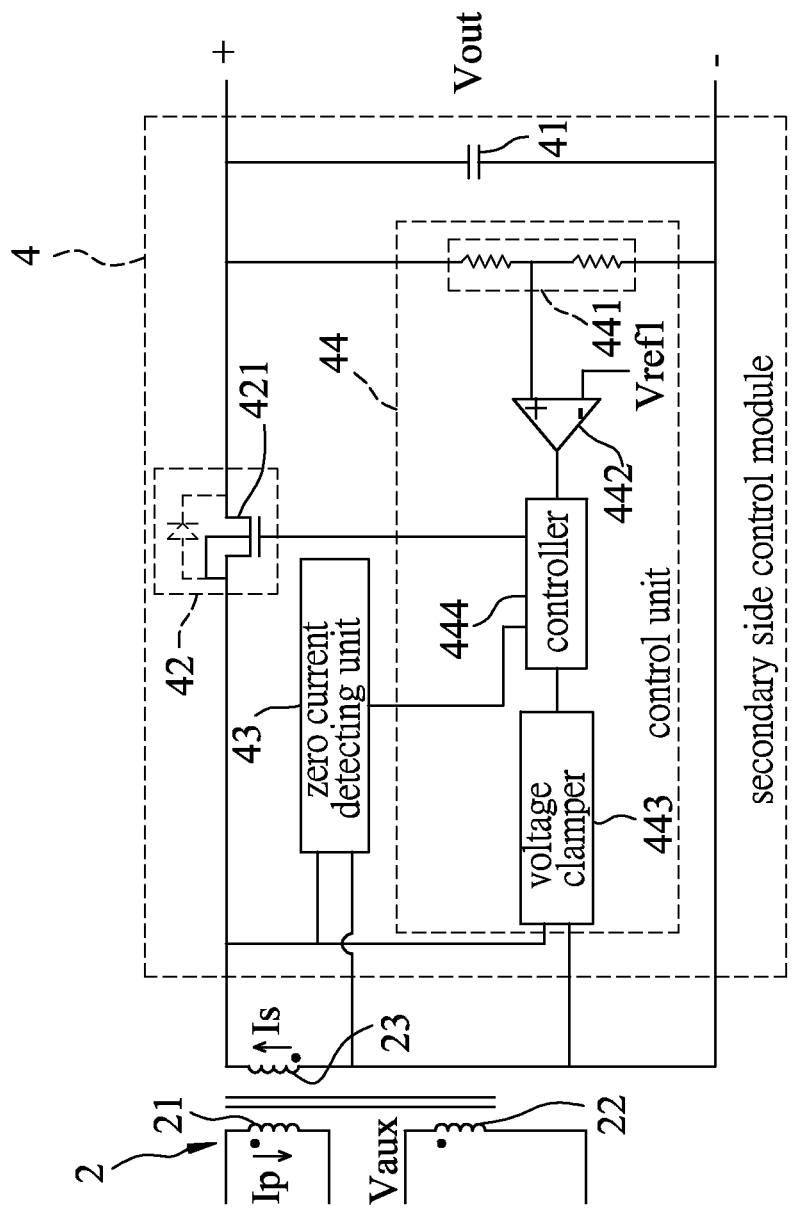
FIG. 7 is a schematic circuit block diagram illustrating a third variation of the secondary side control module of the switching power converting apparatus of the first preferred embodiment.

FIG. 7 illustrates a third variation of the secondary side control module 4. Differently, the rectification switch unit 42 is coupled between the non-dot terminal of the secondary winding 23 of the transformer 2 and the first terminal of the output capacitor 41. In this variation, the gate, the drain, the source and the bulk of the N-type MOSFET 421 are coupled to the controller 444, the first terminal of the output capacitor 41, the non-dot terminal of the secondary winding 23 of the transformer 2, and its source, respectively. The dot-marked terminal of the secondary winding 23 of the transformer 2 is coupled to the second terminal of the output capacitor 41.

Figure 8:
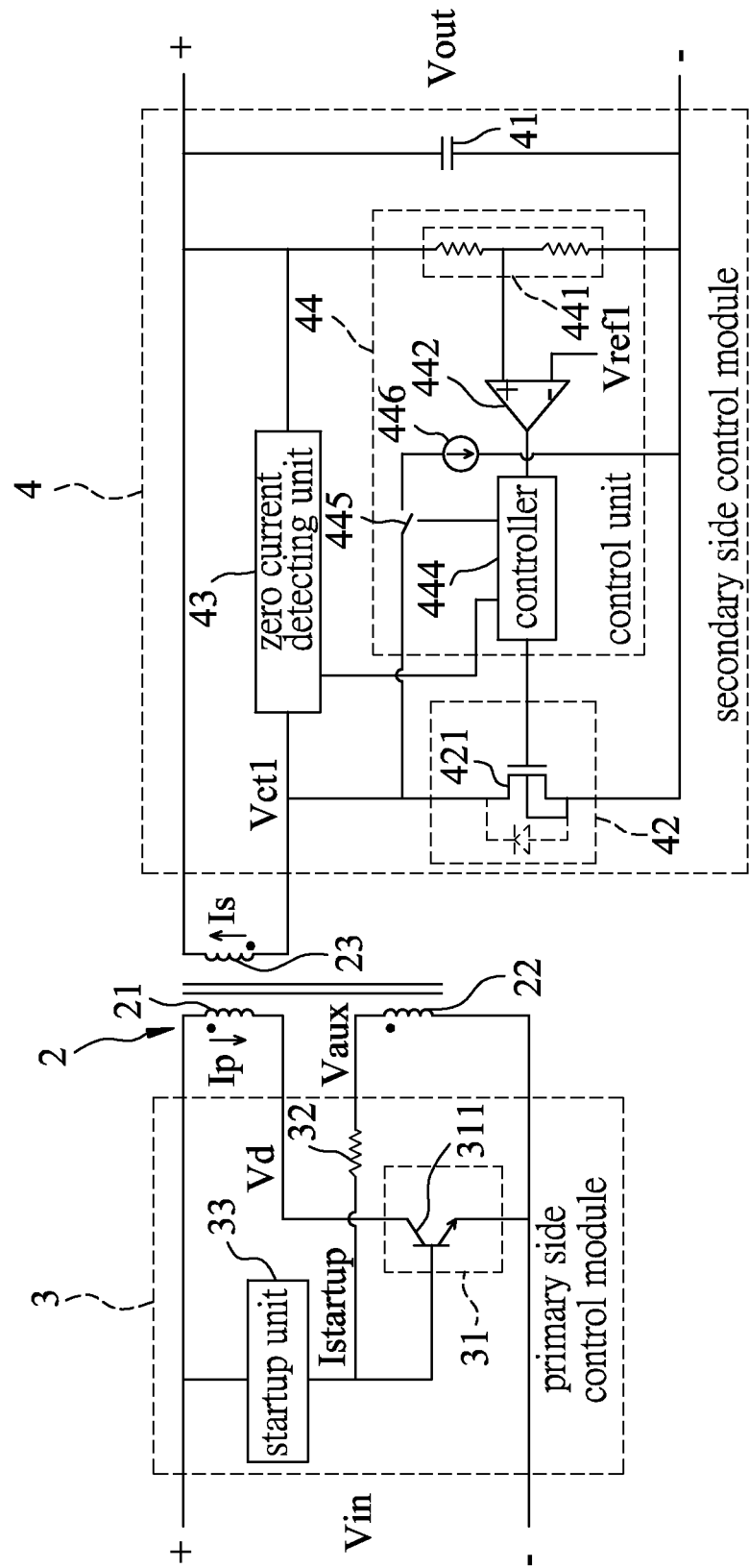
FIG. 8 is a schematic circuit block diagram illustrating the second preferred embodiment of a switching power converting apparatus according to this invention.

FIG. 8 illustrates the second preferred embodiment of a switching power converting apparatus according to this invention, which is a modification of the first preferred embodiment. In this embodiment, a series connection of a switch 445 and a current source 446 is used to replace the voltage clamper 443 of FIG. 3. The series connection of the switch 445 and the current source 446 are coupled in parallel to the rectification switch unit 421. In addition, the switch 445 is coupled to and controlled by the controller 444. The current source 446 is capable of drawing a predetermined current from the dot-marked terminal of the secondary winding 23 of the transformer 2 when the switch 445 conducts. When the comparison signal from the comparator 442 indicates that the divided voltage is greater than the first reference voltage (Vref1) while the controller 444 receives the zero current indication signal, the controller 444 is operable to enable the switch 445 to conduct for a while, such that the current source 446 draws the predetermined current from the dot-marked terminal of the secondary winding 23 of the transformer 2 through the switch 445. As a result, the first BJT 311 will not be enabled to conduct.

In view of the above, the switching power converting apparatus of this embodiment utilizes current-drawing techniques, instead of the aforesaid resistor load connection, to stop self-excited conversion from the input voltage (Vin) to the output voltage (Vout). Therefore, since the aforesaid resistor load connection is not used in the switching power converting apparatus of this embodiment, it is not required for the switching power converting apparatus of this embodiment to determine a resistance value of the aforesaid resistor load connection. In addition, current drift with variations in fabrication process of the current source 446, temperature, etc. is more easily reduced as compared to resistance value drift encountered in the aforesaid conventional switching power converting apparatus.

Figure 9:
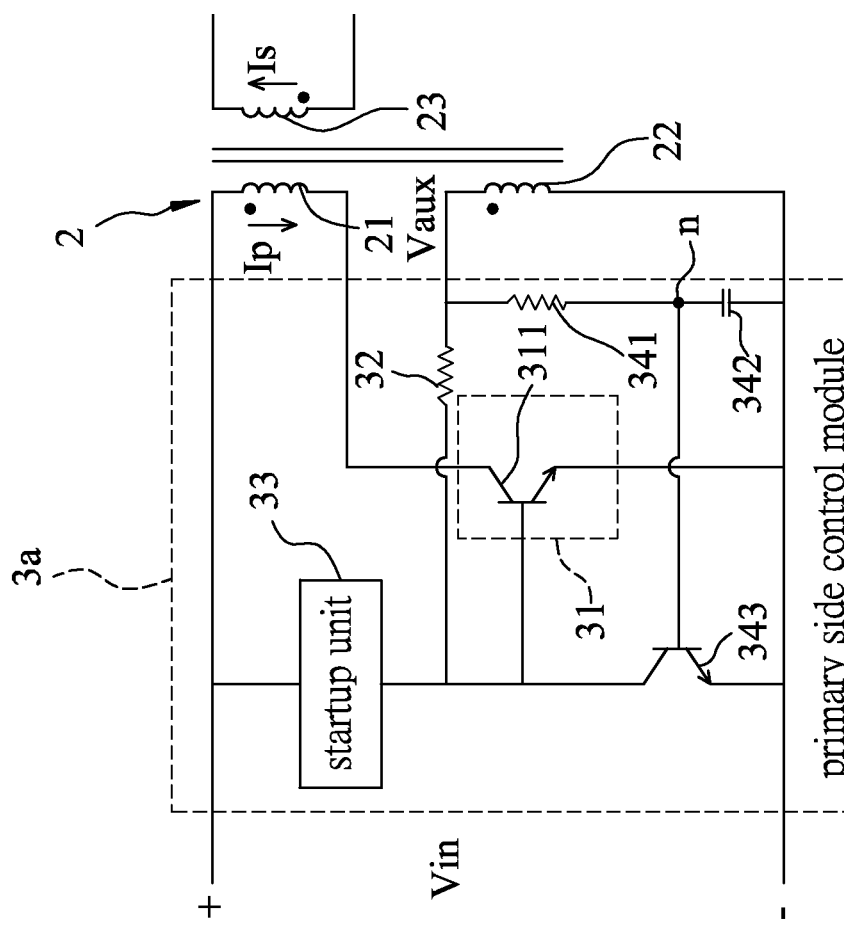
FIG. 9 is a schematic circuit block diagram illustrating a first variation of a primary side control module of the switching power converting apparatus of the second preferred embodiment.

FIG. 9 illustrates a first variation of the primary side control module (3a). Unlike the primary side control module 3 of FIGS. 3 and 8, the primary side control module (3a) further includes a series connection of a second resistor 341 and a capacitor 342, and a second BJT 343. The series connection of the second resistor 341 and the capacitor 342 are coupled across the second primary winding 22 of the transformer 2. The second resistor 341 and the capacitor 342 are coupled to the dot-marked and non-dot terminals of the second primary winding 22 of the transformer 2, respectively. The second BJT 343 has a base coupled to a common node (n) between the second resistor 341 and the capacitor 342, a collector coupled to the base of the first BJT 311, and an emitter coupled to the non-dot terminal of the second primary winding 22 of the transformer 2.

The second resistor 341, the capacitor 342, and the second BJT 343 are used to enable non-conduction of the first BJT 311. A conduction time period of the first BJT 311, i.e., a time period during which the first BJT 311 conducts, depends on a time constant of the second resistor 341 and the capacitor 342.

Figure 10:
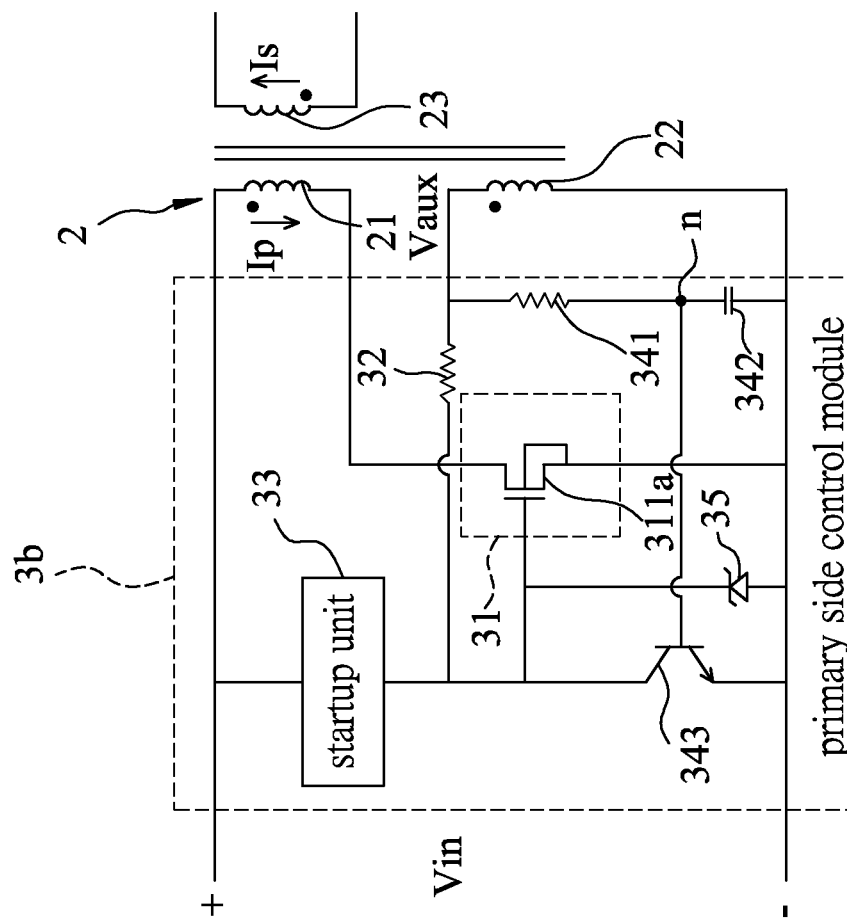
FIG. 10 is a schematic block circuit diagram illustrating a second variation of the primary side control module of the switching power converting apparatus of the second preferred embodiment.

FIG. 10 illustrates a second variation of the primary side control module (3b). Unlike the primary side control module (3a) of FIG. 9, a MOSFET (311a) is used to replace the first BJT 311 of FIG. 9. In addition, the primary side control module (3b) further includes a Zener diode 35.

The MOSFET (311a) has a gate coupled to the resistor 32, the startup unit 33 and the collector of the second BJT 343, a drain coupled to the non-dot terminal of the first primary winding 21 of the transformer 2, a source coupled to the non-dot terminal of the second primary winding 22 of the transformer 2, and a bulk coupled to its source. The Zener diode 35 has an anode coupled to the non-dot terminal of the second primary winding 22 of the transformer 2, and a cathode coupled to the gate of the MOSFET (311a).

The Zener diode 35 clamps a potential at the gate of the MOSFET (311a) to its breakdown voltage when the MOSFET (311a) conducts.

By virtue of the MOSFET (311a), the switching power converting apparatus of this embodiment can provide an enhanced power conversion efficiency.

Figure 11:
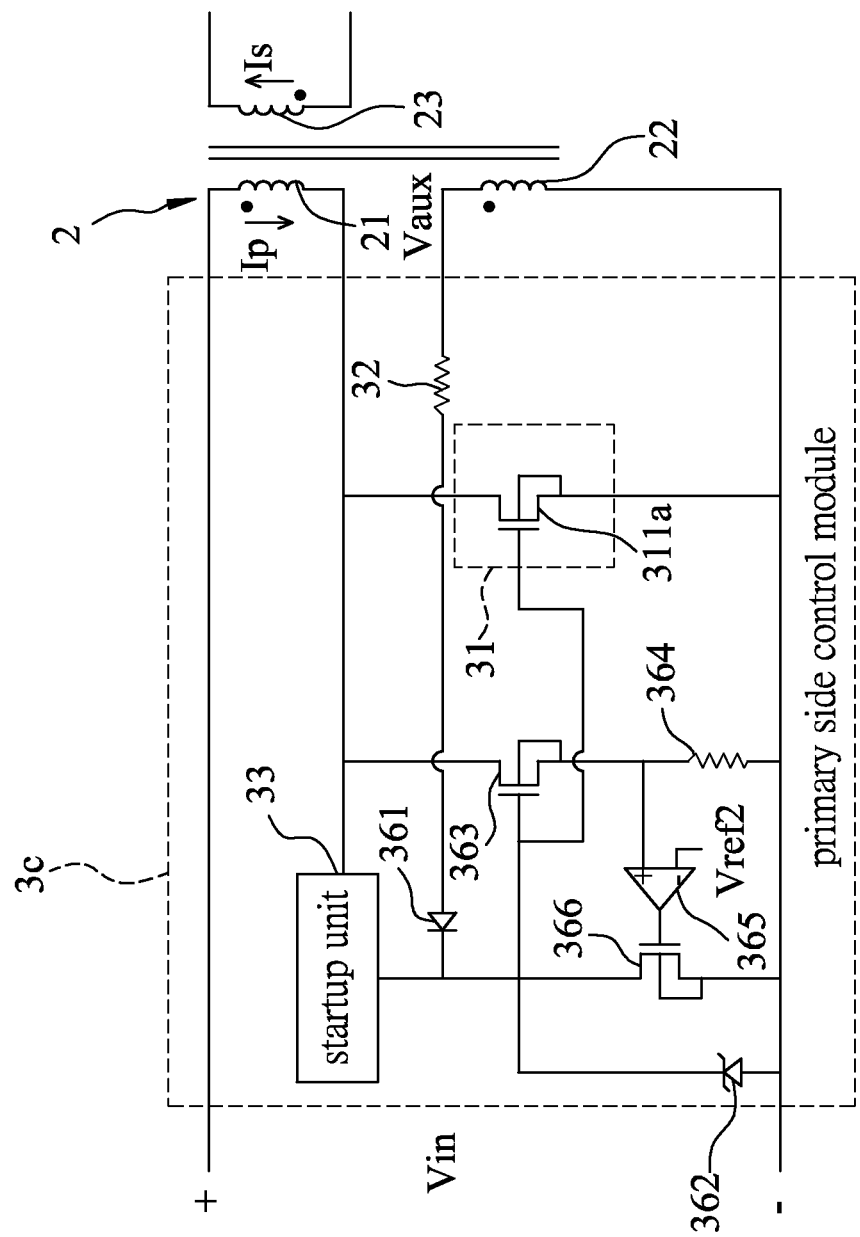
FIG. 11 is a schematic circuit block diagram illustrating a third variation of the primary side control module of the switching power converting apparatus of the second preferred embodiment.

FIG. 11 illustrates a third variation of the primary side control module (3c). Unlike the primary side control module 3 of FIGS. 3 and 8, a first MOSFET (311a) is used to replace the first BJT 311 of FIGS. 3 and 8. In addition, the primary side control module (3c) further includes a diode 361, a Zener diode 362, a second MOSFET 363, a second resistor 364, an amplifier 365, and a third MOSFET 366.

The first MOSFET (311a) has a gate coupled to a cathode of the diode 361, a drain coupled to the non-dot terminal of the first primary winding 21 of the transformer 2, a source coupled to the non-dot terminal of the second primary winding 22 of the transformer 2, and a bulk coupled to its source. The first resistor 32 is coupled between the dot-marked terminal of the second primary winding 22 of the transformer 2 and an anode of the diode 361. The startup unit 33 is coupled to the non-dot terminal of the first primary winding 21 of the transformer 2 and the gate of the first MOSFET (311a). The Zener diode 362 has an anode coupled to the non-dot terminal of the second primary winding 22 of the transformer 2, and a cathode coupled to the gate of the first MOSFET (311a). The second MOSFET 363 has a gate coupled to the gate of the first MOSFET (311a), a drain coupled to the non-dot terminal of the first primary winding 21 of the transformer 2, a source, and a bulk coupled to its source. The second resistor 364 is coupled between the source of the second MOSFET 363 and the non-dot terminal of the second primary winding 22 of the transformer 2. The amplifier 365 has a non-inverting input terminal coupled to the source of the second MOSFET 363, an inverting input terminal adapted for receiving a second reference voltage (Vref2), and an output terminal. The third MOSFET 366 has a gate coupled to the output terminal of the amplifier 365, a drain coupled to the gate of the first MOSFET (311a), a source coupled to the non-dot terminal of the second primary winding 22 of the transformer 2, and a bulk coupled to its source.

The Zener diode 362 clamps a potential at the gate of the first MOSFET (311a) to its breakdown voltage when the first MOSFET (311a) conducts. The second MOSFET 363, the second resistor 364, the amplifier 365, and the third MOSFET 366 are used to enable non-conduction of the first MOSFET (311a). A conduction time period of the first MOSFET (311a), i.e., a time period during which the first MOSFET (311a) conducts, depends on the time at which a potential at the source of the second MOSFET 363 rises to the second reference voltage (Vref2).

By virtue of the MOSFET (311a), the switching power converting apparatus of this embodiment can provide an enhanced power conversion efficiency. Moreover, the switching unit 31, the startup unit 33, the diode 361, the Zener diode 362, the second MOSFET 363, the second resistor 364, the amplifier 365, and the third MOSFET 366 can be integrated into an integrated circuit so as to increase precision of the primary side control module (3c).

Figure 12:
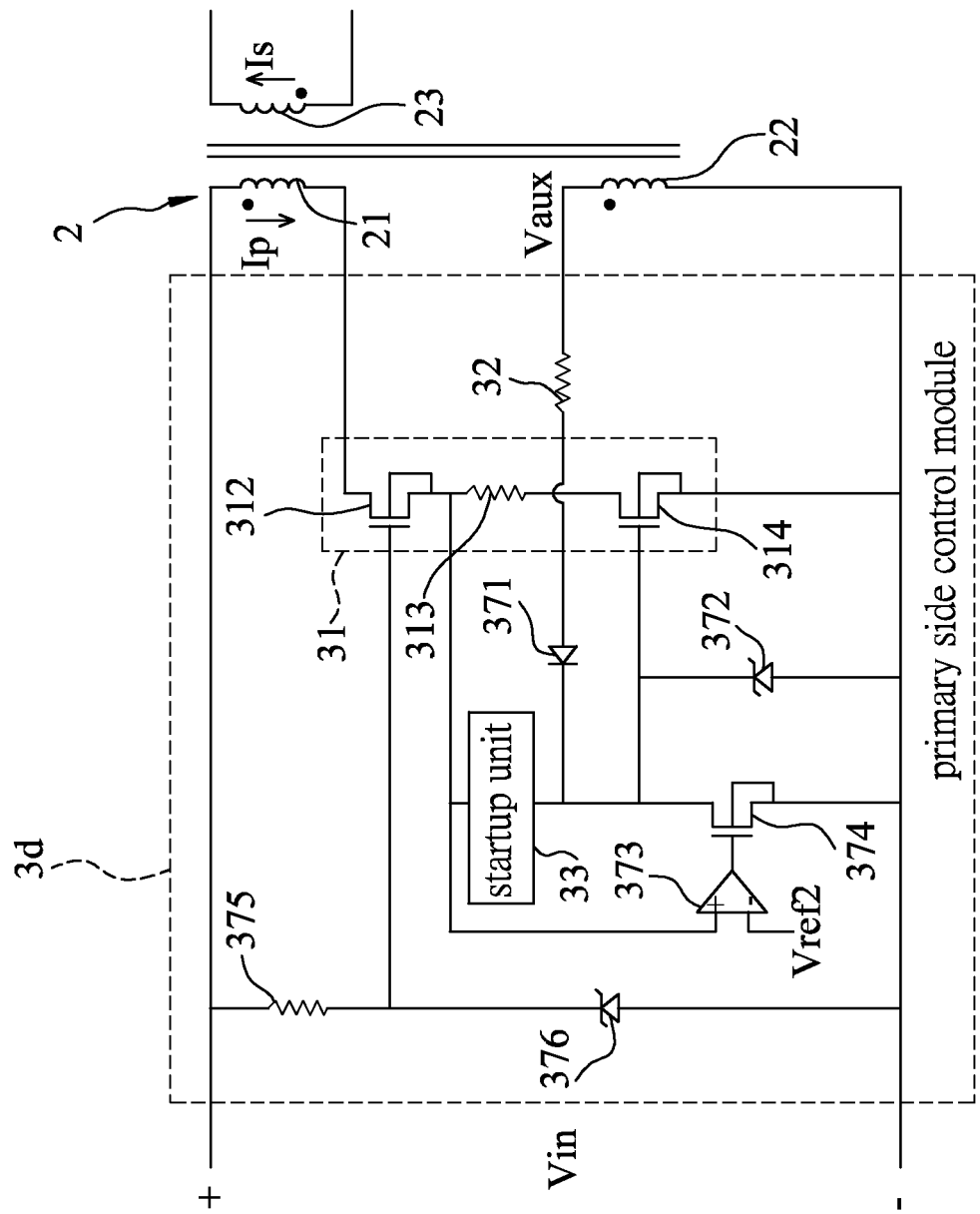
FIG. 12 is a schematic circuit block diagram illustrating a fourth variation of the primary side control module of the switching power converting apparatus of the second preferred embodiment.

FIG. 12 illustrates a fourth variation of the primary side control module (3d). Unlike the primary side control module 3 of FIGS. 3 and 8, a series connection of a first MOSFET 312, a second resistor 313, and a second MOSFET 314 is used to replace the first BJT 311 of FIGS. 3 and 8. In addition, the primary side control module (3d) further includes a diode 371, a first Zener diode 372, an amplifier 373, a third MOSFET 374, a third resistor 375, and a second Zener diode 376.

Each of the first and second MOSFETs 312, 314 has a gate, a drain, a source, and a bulk coupled to its source. The drain of the first MOSFET 312 is coupled to the non-dot terminal of the first primary winding 21 of the transformer 2. The source and the gate of the second MOSFET 314 are coupled to the non-dot terminal of the second primary winding 22 of the transformer 2 and a cathode of the diode 371, respectively. The second resistor 313 is coupled between the source of the first MOSFET 312 and the drain of the second MOSFET 313. Conduction of the second MOSFET 314 causes the switching unit 31 to be in the ON state. Non-conduction the second MOSFET 314 causes the switching unit 31 to be in the OFF state.

The first resistor 32 is coupled between the dot-marked terminal of the second primary winding 22 of the transformer 2 and an anode of the diode 371. The startup circuit 33 is coupled to the source of the first MOSFET 312 and the gate of the second MOSFET 314. The first Zener diode 372 has an anode coupled to the non-dot terminal of the second primary winding 22 of the transformer 2, and a cathode coupled to the gate of the second MOSFET 314. The amplifier 373 has a non-inverting input terminal coupled to the source of the first MOSFET 312, an inverting input terminal adapted for receiving a second reference voltage (Vref2), and an output terminal. The third MOSFET 374 has a gate coupled to the output terminal of the amplifier 373, a drain coupled to the gate of the second MOSFET 314, a source coupled to the non-dot terminal of the second primary winding 22 of the transformer 2, and a bulk coupled to its source. The third resistor 375 is coupled between the dot-marked terminal of the first primary winding 21 of the transformer 2 and the gate of the first MOSFET 312. The second Zener diode 376 has an anode coupled to the non-dot terminal of the second primary winding 22 of the transformer 2, and a cathode coupled to the gate of the first MOSFET 312.

The first Zener diode 372 clamps a potential at the gate of the second MOSFET 314 to be equal to its breakdown voltage when the second MOSFET 314 conducts. The amplifier 373 and the third MOSFET 374 are used to enable non-conduction of the second MOSFET 314. A conduction time period of the second MOSFET 314, i.e., a time period during which the second MOSFET 314 conducts, depends on the time at which a potential at the source of the first MOSFET 313 rises to the second reference voltage (Vref2). When the second MOSFET 314 conducts, the third resistor 375 and the second Zener diode 376 are used to supply a conduction voltage of the first MOSFET 312 to the gate of the first MOSFET 312.

Due to the first and second MOSFETs 312, 314, the switching power converting apparatus of this embodiment can provide an enhanced power conversion efficiency. Moreover, the second resistor 313, the second MOSFET 314, the startup unit 33, the diode 371, the first Zener diode 372, the amplifier 373 and the third MOSFET 374 can be integrated into an integrated circuit so as to increase precision of the primary side control module (3d). The integrated circuit can also be fabricated using a pure low voltage fabrication process. Furthermore, since the source of the second MOSFET 314 is coupled directly to the non-dot terminal of the second primary winding 212 of the transformer 2, it is easy to enable the second MOSFET 314 to conduct or non-conduct.

Figure 13:
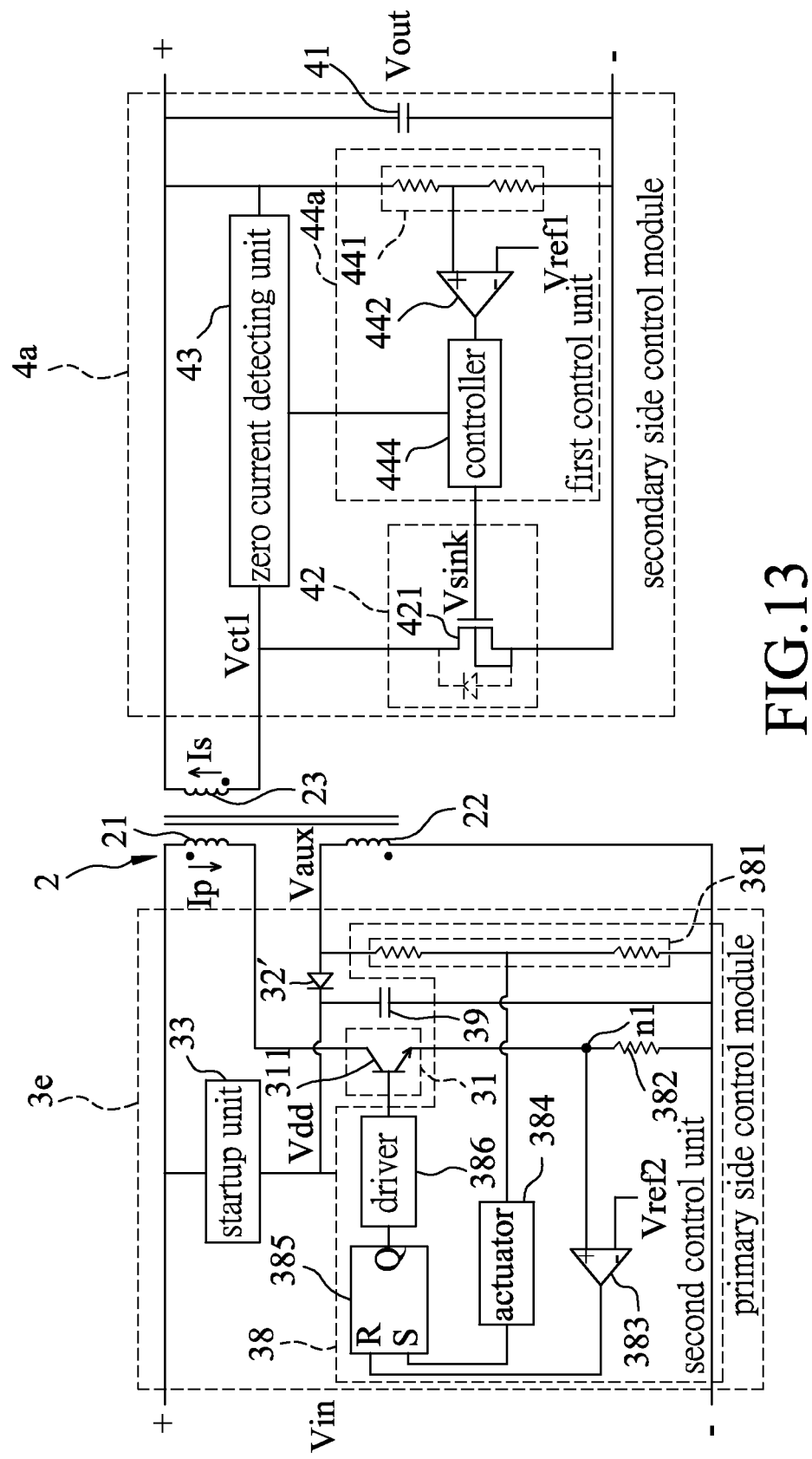
FIG. 13 is a schematic circuit block diagram illustrating the third preferred embodiment of a switching power converting apparatus according to this invention.

FIG. 13 illustrates the third preferred embodiment of a switching power converting apparatus according to this invention, which is a modification of the first preferred embodiment. In this embodiment, the switching power converting apparatus is a non-self-excited switching power converting apparatus. Unlike the first preferred embodiment, the secondary side control module (4a) includes a first control unit (44a) that is used to replace the control unit 44 of FIG. 3. The first control unit (44a) differs from the control unit 44 of FIG. 3 in that the voltage clamper 443 of FIG. 3 is omitted. In addition, when the comparison signal indicates that the divided voltage from the voltage divider 441 is less than the first reference voltage (Vref1), i.e., the output voltage (Vout) is less than the predetermined target voltage (Vtarget), while the controller 444 receives the zero current indication from the zero current detecting unit 43, the controller 444 is operable, based on the comparison signal from the comparator 442, to enable the N-type MOSFET 421 of the rectification switch unit 42 to conduct, i.e., the ON state, for the predetermined time period.

Furthermore, the primary side control module (3e) further includes a diode 32', which is used to replace the first resistor 32 of FIG. 3, a second control unit 38, and a capacitor 39.

The diode 32' has an anode coupled to the non-dot terminal of the second primary winding 22 of the transformer 2, and a cathode coupled to the startup unit 33. The base of the first BJT 311 of the switching unit 31 is coupled to the second control unit 38, and is used to receive a control voltage therefrom.

The second control unit 38 is coupled to the second primary winding 22 of the transformer 2 and the emitter of the first BJT 311 of the switching unit 31. The second control unit 38 is operable to detect the potential (Vaux) at the non-dot terminal of the second primary winding 22 of the transformer 2 and the current (Ip). Upon detecting, based on the potential (Vaux), that the output voltage (Vout) is less than a predetermined start voltage (Vstart) and that the current (Is) becomes zero, the second control unit 38 is operable to enable the first BJT 311 of the switching unit 31 to conduct, i.e., the ON state. Upon detecting, based on the potential (Vaux), that the output voltage (Vout) is greater than the predetermined start voltage (Vstart) and less than the predetermined target voltage (Vout), the second control unit 38 is operable to enable the first BJT 311 of the switching unit 31 to conduct. Upon detecting that the current (Ip) is greater than a predetermined target current (Itarget), the second control unit 38 is operable to enable non-conduction of the first BJT 311 of the switching unit 31, i.e., the OFF state.

In this embodiment, the second control unit 38 of the primary side control module (3e) includes a voltage divider 381, a resistor 382, an amplifier 383, an actuator 384, an RS flip-flop 385, and a driver 386.

The voltage divider 381 is coupled in parallel to the second primary winding 22 of the transformer 2 for dividing the voltage (Vaux) thereacross so as to output an auxiliary divided voltage corresponding to the voltage (Vaux) across the second primary winding 22 of the transformer 2. In this embodiment, the voltage divider 381 is, but not limited to, a resistive voltage divider.

The resistor 382 is coupled between the emitter of the first BJT 311 of the switching unit 31 and the dot-marked terminal of the second primary winding 22 of the transformer 2.

The amplifier 383 has a non-inverting input terminal coupled to a common node (n1) between the emitter of the first BJT 311 of the switching unit 31 and the resistor 382, an inverting input terminal adapted for receiving a second reference voltage (Vref2), and an output terminal for outputting a reset signal.

The actuator 384 is coupled to the voltage divider 381 for receiving the auxiliary divided voltage therefrom, and is operable to output a set signal based on the auxiliary divided voltage.

The RS flip-flop 385 has a reset terminal (R) coupled to the output terminal of the amplifier 383 for receiving the reset signal therefrom, a set terminal (S) coupled to the actuator 384 for receiving the set signal therefrom, and an output terminal (Q) for outputting a control signal.

The driver 386 is coupled to the output terminal (Q) of the RS flip-flop 385 and the base of the first BJT 311 of the switching unit 31, and receives the control signal from the output terminal (Q) of the RS flip-flop 385. The driver 386 is operable to generate the control voltage based on the control signal.

The amplifier 383 outputs the reset signal when the potential at the common node (n1) is greater than the second reference voltage (Vref2), i.e., the current (Ip) is greater than the predetermined target current (Itarget), such that the RS flip-flop 385 resets the control signal to a logic low level upon receipt of the reset signal. Thus, the driver 626 enables non-conduction of the first BJT 311 of the switching unit 31 in response to the control signal having the logic low level.

When a peak value of the divided auxiliary voltage is less than a voltage corresponding to the predetermined start voltage (Vstart), i.e., the output voltage (Vout) is less than the predetermined start voltage (Vstart), the switching power converting apparatus of this embodiment operates in an auto start mode, and the actuator 624 outputs the set signal first. Thus, the RS flip-flop 385 sets the control signal to a logic high level upon receipt of the set signal. In addition, the driver 626 enables the first BJT 311 of the switching unit 31 to conduct in response to the control signal having the logic high level. Then, the actuator 624 outputs the set signal when the auxiliary divided voltage falls to zero, i.e., the current (Is) becomes zero, thereby enabling the first BJT 311 of the switching unit 31 to conduct.

When the peak value of the divided auxiliary voltage is greater than the voltage corresponding to the predetermined start voltage (Vstart), i.e., the output voltage (Vout) is greater than the predetermined start voltage (Vstart), the switching power converting apparatus of this embodiment operates in a regulation mode. In the regulation mode, when the auxiliary divided voltage first falls to zero and then becomes positive, i.e., the secondary side control module (4a) detects that the current (Is) becomes zero, the actuator 384 outputs the set signal so as to enable the first BJT 311 of the switching unit 31 to conduct.

The capacitor 39 is used to provide a power supply voltage (Vdd) thereacross to the second control unit 38. When the input voltage (Vin) rises to a predetermined first voltage level, the startup unit 33 first charges the capacitor 39 for a while. Thereafter, the second primary winding 23 of the transformer 2 charges the capacitor 39 through the diode 32'.

Figure 14:
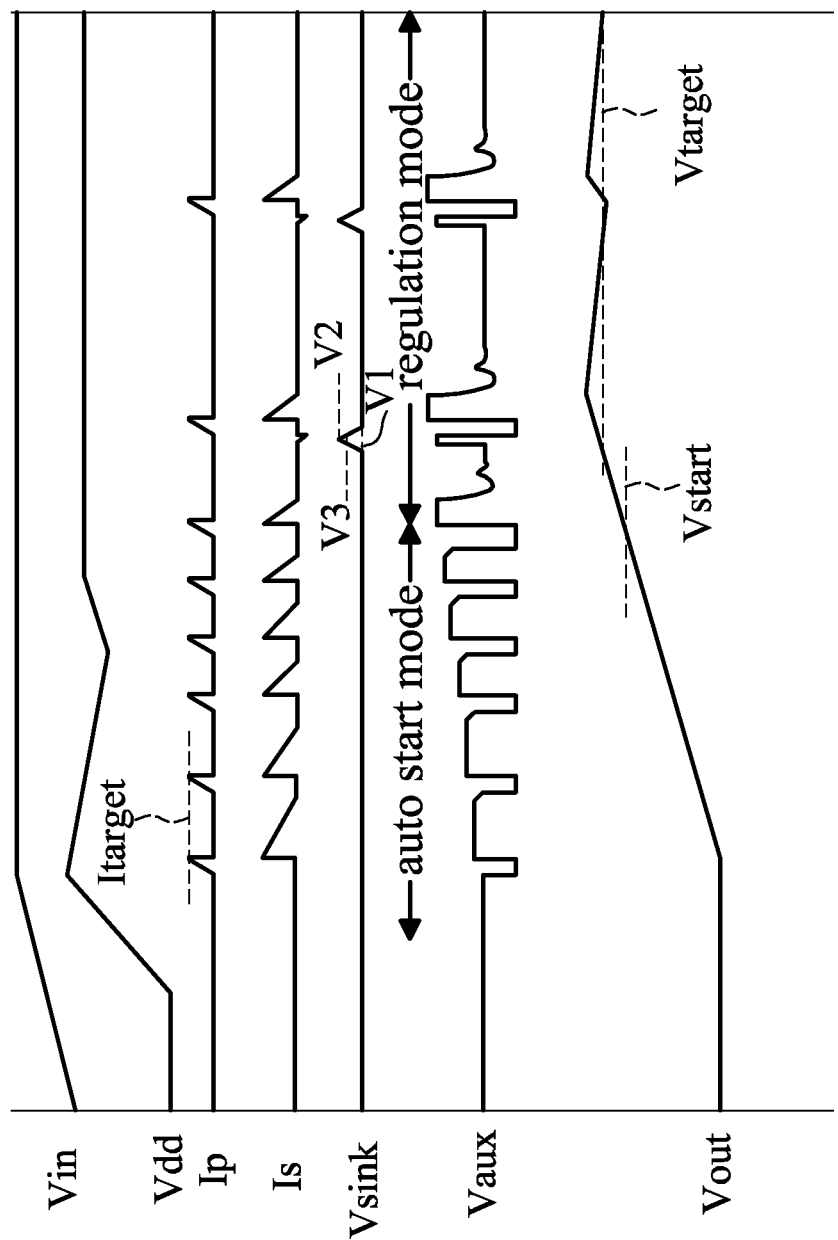
FIG. 14 is a timing diagram for illustrating operation of the switching power converting apparatus of the third preferred embodiment.

Referring to FIGS. 13 and 14, operations of the switching power converting apparatus of this embodiment are described below. First, when the input voltage (Vin) rises to the predetermined first voltage level, the startup unit 33 begins to charge the capacitor 39 such that the power supply voltage (Vdd) rises. When the power supply voltage (Vdd) rises to a predetermined second voltage level, the actuator 384 outputs the set signal so as to enable the first BJT 311 to conduct. Accordingly, the current (Ip) begins to flow through the first primary winding 21 of the transformer 2, and rises gradually.

When the current (Ip) is greater than the predetermined target current (Itarget), the amplifier 383 outputs the reset signal so as to enable non-conduction of the first BJT 311. Accordingly, the current (Is) begins to flow through the secondary winding 23 of the transformer 2, the output voltage (Vout) rises gradually, and the current (Is) falls gradually.

Then, when the current (Is) becomes zero, the actuator 384 outputs the set signal so as to enable the first BJT 311 to conduct. Accordingly, the current (Ip) begins to flow through the first primary winding 21 of the transformer 2, and rises gradually.

The aforesaid switching operation of the first BJT 311 between conduction and non-conduction in response to the set signal from the actuator 384 and the reset signal from the amplifier 383 continuously proceeds such that the output voltage (Vout) keeps on rising until the output voltage (Vout) is greater than the predetermined start voltage (Vstart).

Then, when the output voltage (Vout) is less than the predetermined target voltage (Vtarget), the controller 444 enables the N-type MOSFET 421 to conduct for the predetermined time period. Thus, the potential (Vaux) becomes positive, and the actuator 384 outputs the set signal to enable the first BJT 311 to conduct. Therefore, the current (Ip) begins to flow through the first primary winding 21 of the transformer 2, and rises gradually.

Next, when the current (Ip) is greater than the predetermined target current (Itarget), the amplifier 383 outputs the reset signal so as to enable non-conduction of the first BJT 311. Therefore, the current (Is) begins to flow through the secondary winding 23 of the transformer 2, the output voltage (Vout) rises, and the current (Is) falls gradually.

Preferably, upon enabling the N-type MOSFET 421 to conduct, the controller 444 is operable to gradually increase a potential (Vsink) at the gate of the N-type MOSFET 421 from a first voltage level (V1) to a second voltage level (V2), and then gradually decrease the same from the second voltage level (V2) to the first voltage level (V1). The N-type MOSFET 421 conducts when the potential (Vsink) is greater than a third voltage level (V3). The N-type MOSFET 421 non-conducts when the potential (Vsink) at the gate of the N-type MOSFET 421 is less than the third voltage level (V3). As a result, the switching power converting apparatus of this embodiment has reduced electro-magnetic interference.

In view of the above, since non-self-excited conversion techniques are used in the switching power converting apparatus of this embodiment, the resistor load connection is not present in the switching power converting apparatus of this embodiment. Therefore, it is not required for the switching power converting apparatus of this embodiment to determine a resistance value of the aforesaid resistor load connection. In addition, resistance value drift encountered in the aforesaid conventional switching power converting apparatus can be effectively avoided.

Figure 15:
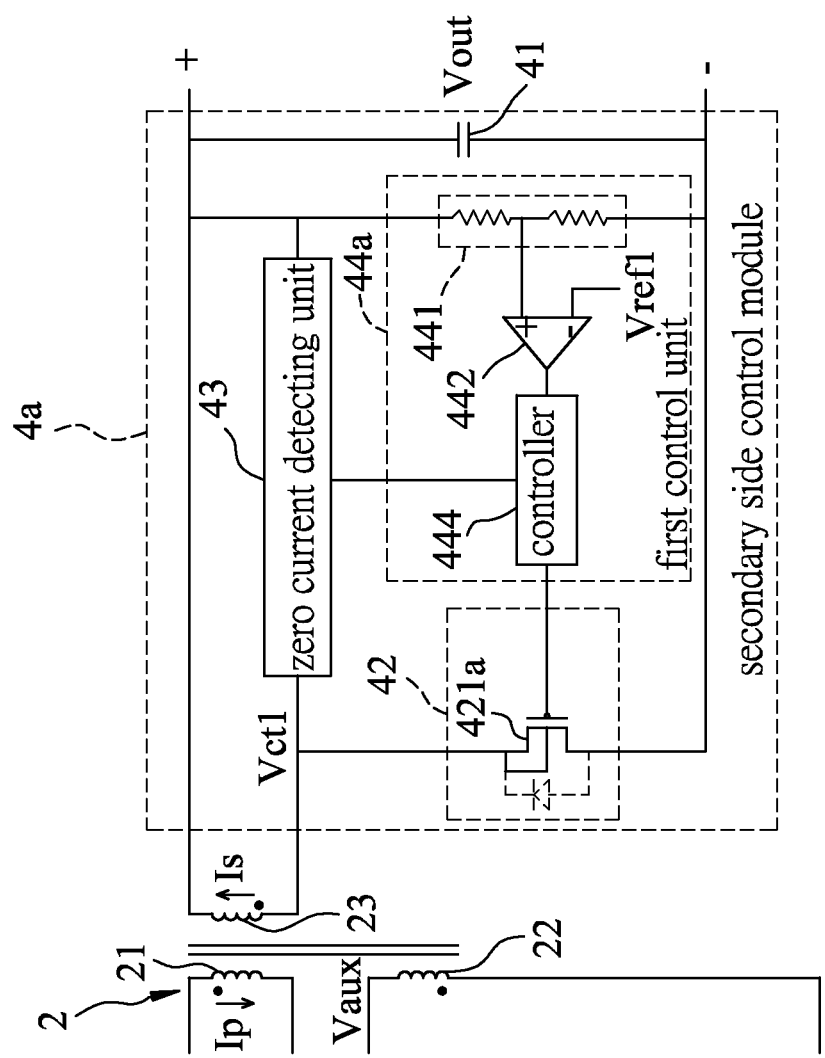
FIG. 15 is a schematic circuit block diagram illustrating a first variation of a secondary side control module of the switching power converting apparatus of the third preferred embodiment.

FIG. 15 illustrates a first variation of the secondary side control module (4a). Unlike the secondary side control module (4a) of FIG. 13, a P-type MOSFET (421a) is used to replace the N-type MOSFET 421 of FIG. 13. The P-type MOSFET (421a) has a gate coupled to the controller 444, a drain coupled to the second terminal of the output capacitor 41, a source coupled to the dot-marked terminal of the secondary winding 23 of the transformer 2, and a bulk coupled to its source.

Figure 16:
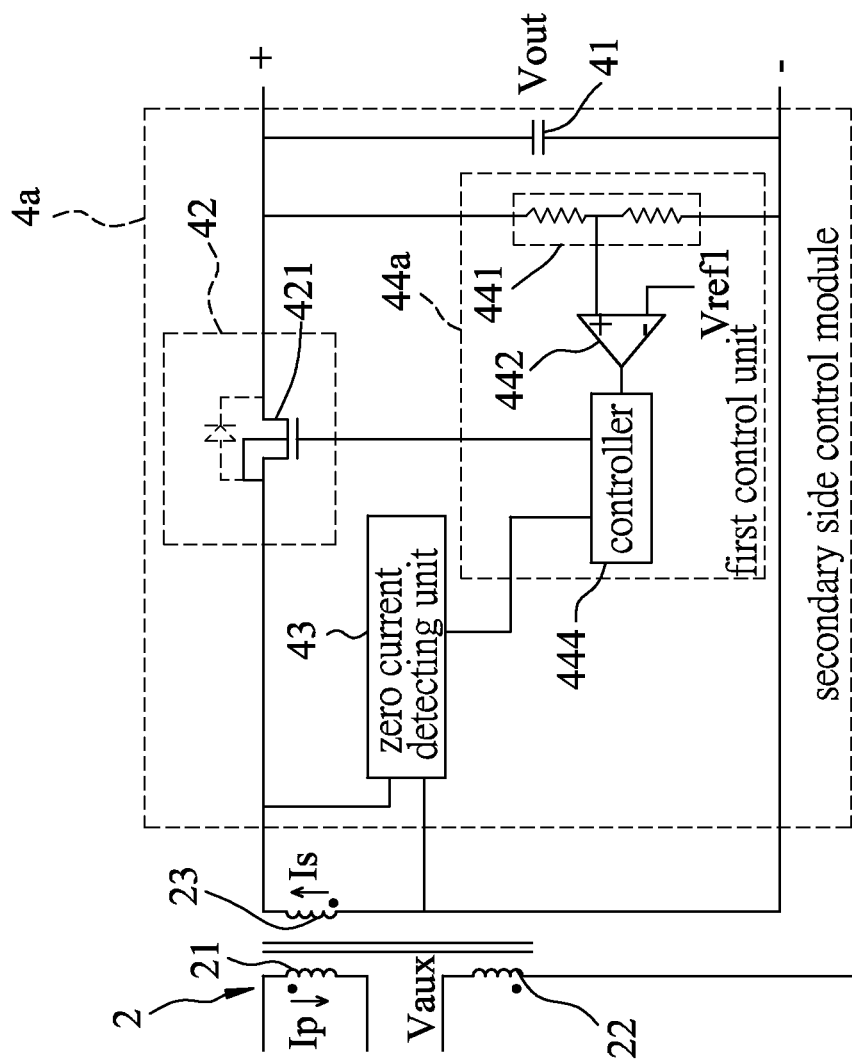
FIG. 16 is a schematic circuit block diagram illustrating a second variation of the secondary side control module of the switching power converting apparatus of the third preferred embodiment.

FIG. 16 illustrates a second variation of the secondary side control module (4a). Unlike the secondary side control module (4a) of FIG. 13, the rectification switch unit 42 is coupled between the non-dot terminal of the secondary winding 23 of the transformer 2 and the first terminal of the output capacitor 41. The gate, the drain, the source and the bulk of the N-type MOSFET 421 of the rectification switch unit 42 are coupled to the controller 444, the first terminal of the output capacitor 41, the non-dot terminal of the secondary winding 23 of the transformer 2, and its source, respectively. The dot-marked terminal of the secondary winding 23 of the transformer 2 is coupled to the second terminal of the output capacitor 41.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A switching power converting apparatus comprising:
   a transformer including a first primary winding, a second primary winding, and a secondary winding, each of said first and second primary windings and said secondary winding having a dot-marked terminal and a non-dot terminal;
   a primary side control module including a switching unit coupled between said non-dot terminal of said first primary winding of said transformer and said non-dot terminal of said second primary winding of said transformer; and a secondary side control module including
an output capacitor for providing an output voltage thereacross,
a rectification switch unit coupled between said secondary winding of said transformer and said output capacitor, said rectification switch unit being operable in one of an OFF state, where said rectification switch unit permits current flow through said secondary winding of said transformer from said dot-marked terminal to said non-dot terminal, and an ON state, where said rectification switch unit permits current flow through said secondary winding of said transformer from said non-dot terminal to said dot-marked terminal,
a zero current detecting unit coupled to said secondary winding of said transformer for detecting a current flowing through said secondary winding of said transformer so as to output a zero current indication signal upon detecting that the current becomes zero, and
a control unit coupled to said secondary winding of said transformer, said output capacitor, said rectification switch unit, and said zero current detecting unit, configured to receive the zero current indication signal from said zero current detecting unit, and configured to detect the output voltage across said output capacitor;
wherein said control unit of said secondary side control module is operable to
enable said rectification switch unit to operate in the ON state for a predetermined time period upon detecting that the output voltage is less than a predetermined target voltage, and
upon detecting that the output voltage is greater than the predetermined target voltage and upon receipt of the zero current indication signal from said zero current detecting unit, perform one of clamping a potential at said dot-marked terminal of said secondary winding of said transformer to be lower than a potential at said non-dot terminal of said secondary winding of said transformer, and drawing a predetermined current from said dot-marked terminal of said secondary winding of said transformer.

2. The switching power converting apparatus of claim 1, wherein said rectification switch unit of said secondary side control module includes one of an N-type metal-oxide-semiconductor field effect transistor (MOSFET), a P-type MOSFET, and a combination of an N-type MOSFET and an amplifier.

3. The switching power converting apparatus of claim 1, wherein, in the case of said control unit of said secondary side control module being operable to clamp the potential at said dot-marked terminal of said secondary winding of said transformer to be lower than the potential at said non-dot terminal of said secondary winding of said transformer upon detecting that the output voltage is greater than the predetermined target voltage and upon receipt of the zero current indication signal from said zero current detecting unit, said control unit of said secondary side control module includes
a voltage divider coupled in parallel to said output capacitor for dividing the output voltage across said output capacitor so as to output a divided voltage corresponding to the output voltage,
a comparator coupled to said voltage divider for comparing the divided voltage from said voltage divider with a reference voltage corresponding to the predetermined target voltage so as to output a comparison signal based on a comparison result of comparison thus made,
a voltage clamper coupled across said secondary winding of said transformer, and being operable to clamp the potential at said dot-marked terminal of said secondary winding of said transformer to be lower than the potential at said non-dot terminal of said secondary winding of said transformer, and
a controller coupled to said rectification switch unit, said zero current detecting unit, said comparator and said voltage clamper, configured to receive the zero current indication signal from said zero current detecting unit and the comparison signal from said comparator, and being operable to control said rectification switch unit and said voltage clamper;
wherein said controller of said control unit of said secondary side control module is operable based on the comparison signal to
when the comparison signal indicates that the divided voltage is less than the reference voltage, enable said rectification switch unit to operate in the ON state for the predetermined time period, and
when the comparison signal indicates that the divided voltage is greater than the reference voltage while said controller receives the zero current indication signal from said zero current detecting unit, enable said voltage clamper to clamp the potential at said dot-marked terminal of said secondary winding of said transformer to be lower than the potential at said non-dot terminal of said secondary winding of said transformer.

4. The switching power converting apparatus of claim 3, wherein:
said dot-marked terminal of said secondary winding of said transformer is coupled to said rectification switch unit; and
said non-dot terminal of said secondary winding of said transformer is coupled to said output capacitor.

5. The switching power converting apparatus of claim 3, wherein:
said non-dot terminal of said secondary winding of said transformer is coupled to said rectification switch unit; and
said dot-marked terminal of said secondary winding of said transformer is coupled to said output capacitor.

6. The switching power converting apparatus of claim 1, wherein:
said dot-marked terminal of said secondary winding of said transformer is coupled to said rectification switch unit;
in the case of said control unit of said secondary side control module being operable to draw the predetermined current from said dot-marked terminal of said secondary winding of said transformer upon detecting that the output voltage is greater than the predetermined target voltage and upon receipt of the zero current indication signal from said zero current detecting unit, said control unit includes
a voltage divider coupled in parallel to said output capacitor for dividing the output voltage across said output capacitor so as to output a divided voltage corresponding to the output voltage,
a comparator coupled to said voltage divider for comparing the divided voltage from said voltage divider with a reference voltage corresponding to the predetermined target voltage so as to output a comparison signal based on a comparison result of comparison thus made,
a series connection of a switch and a current source coupled in parallel to said rectification switch unit, said current source being capable of drawing the predetermined current from said dot-marked terminal of said secondary winding of said transformer when said switch conducts, and
a controller coupled to said rectification switch unit, said zero current detecting unit, said comparator, and said switch, configured to receive the zero current indication signal from said zero current detecting unit and the comparison signal from said comparator, and being operable to control said rectification switch unit and said switch; and
said controller of said control unit of said secondary side control module is operable based on the comparison signal to
when the comparison signal indicates that the divided voltage is less than the reference voltage, enable said rectification switch unit to operate in the ON state for the predetermined period of time, and
when the comparison signal indicates that the divided voltage is greater than the reference voltage while said controller receives the zero current indication signal, enable said switch to conduct such that said current source draws the predetermined current from said dot-marked terminal of said secondary winding of said transformer through said switch.

7. The switching power converting apparatus of claim 1, wherein:
said switching unit of said primary side control module includes a first bipolar junction transistor (BJT) that has a base, a collector coupled to said non-dot terminal of said first primary winding of said transformer, and an emitter coupled to said non-dot terminal of said second primary winding of said transformer; and
said primary side control module further includes a first resistor coupled between said dot-marked terminal of said second primary winding of said transformer and said base of said first BJT.

8. The switching power converting apparatus of claim 7, wherein said primary side control module further includes:
a series connection of a second resistor and a capacitor coupled across said second primary winding of said transformer, said second resistor and said capacitor being coupled to said dot-marked and non-dot terminals of said second primary winding of said transformer, respectively; and
a second BJT having a base coupled to a common node between said second resistor and said capacitor, a collector coupled to said base of said first BJT, and an emitter coupled to said non-dot terminal of said second primary winding of said transformer.

9. The switching power converting apparatus of claim 1, wherein:
said switching unit of said primary side control module includes a MOSFET that has a gate, a drain coupled to said non-dot terminal of said first primary winding of said transformer, and a source coupled to said non-dot terminal of said second primary winding of said transformer; and
said primary side control module further includes
a first resistor coupled between said dot-marked terminal of said second primary winding of said transformer and said gate of said MOSFET,
a series connection of a second resistor and a capacitor coupled across said second primary winding of said transformer, said second resistor and said capacitor being coupled to said dot-marked and non-dot terminals of said second primary winding of said transformer, respectively,
a BJT having a base coupled to a common node between said second resistor and said capacitor, a collector coupled to said gate of said MOSFET, and an emitter terminal coupled to said non-dot terminal of said second primary winding of said transformer, and
a Zener diode having an anode coupled to said non-dot terminal of said second primary winding of said transformer, and a cathode coupled to said gate of said MOSFET.

10. The switching power converting apparatus of claim 1, wherein:
said switching unit of said primary side control module includes a first MOSFET that has a gate, a drain coupled to said non-dot terminal of said first primary winding of said transformer, and a source coupled to said non-dot terminal of said second primary winding of said transformer; and
said primary side control module further includes
a first resistor coupled at one end to said dot-marked terminal of said second primary winding of said transformer;
a diode having an anode coupled to the other end of said first resistor, and a cathode coupled to said gate of said first MOSFET,
a Zener diode having an anode coupled to said non-dot terminal of said second primary winding of said transformer, and a cathode coupled to said gate of said first MOSFET,
a second MOSFET having a gate coupled to said gate of said first MOSFET, a drain coupled to said non-dot terminal of said first primary winding of said transformer, and a source,
a second resistor coupled between said source of said second MOSFET and said non-dot terminal of said second primary winding of said transformer,
an amplifier having a non-inverting input terminal coupled to said source of said second MOSFET, an inverting input terminal adapted for receiving a reference voltage, and an output terminal, and
a third MOSFET having a gate coupled to said output terminal of said amplifier, a drain coupled to said gate of said first MOSFET, and a source coupled to said non-dot terminal of said second primary winding of said transformer.

11. The switching power converting apparatus of claim 1, wherein:
said switching unit of said primary side control module includes a series connection of a first MOSFET, a resistor, and a second MOSFET, each of said first and second MOSFETs having a gate, a drain, and a source, said drain of said first MOSFET being coupled to said non-dot terminal of said first primary winding of said transformer, said source of said second MOSFET being coupled to said non-dot terminal of said second primary winding of said transformer, said resistor being coupled between said source of said first MOSFET and said drain of said second MOSFET; and
said primary side control module further includes
a diode having an anode, and a cathode coupled to said gate of said second MOSFET, a resistor coupled between said dot-marked terminal of said second primary winding of said transformer and said anode of said diode, a first Zener diode having an anode coupled to said non-dot terminal of said second primary winding of said transformer, and a cathode coupled to said gate of said second MOSFET, an amplifier having a non-inverting input terminal coupled to said source of said first MOSFET, an inverting input terminal adapted for receiving a reference voltage, and an output terminal, and a third MOSFET having a gate coupled to said output terminal of said amplifier, a drain coupled to said gate of said second MOSFET, and a source coupled to said non-dot terminal of said second primary winding of said transformer.

12. The switching power converting apparatus of claim 11, wherein said primary side control module further includes:
a third resistor coupled between said dot-marked terminal of said first primary winding of said transformer and said gate of said first MOSFET; and
a second Zener diode having an anode coupled to said non-dot terminal of said second primary winding of said transformer, and a cathode coupled to said gate of said first MOSFET.

13. A switching power converting apparatus comprising:
a transformer including a first primary winding, a second primary winding, and a secondary winding, each of said first and second primary windings and said secondary winding having a dot-marked terminal and a non-dot terminal;
a secondary side control module including
an output capacitor for providing an output voltage thereacross,
a rectification switch unit coupled between said secondary winding of said transformer and said output capacitor, said rectification switch unit being operable in one of an OFF state, where said rectification switch unit permits current flow through said secondary winding of said transformer from said dot-marked terminal to said non-dot terminal, and an ON state, where said rectification switch unit permits current flow through said secondary winding of said transformer from said non-dot terminal to said dot-marked terminal,
a zero current detecting unit coupled to said secondary winding of said transformer for detecting a current flowing through said secondary winding of said transformer so as to output a zero-current indication signal upon detecting that the current becomes zero, and
a first control unit coupled to said output capacitor, said rectification switch unit, and said zero current detecting unit, configured to receive the zero current indication signal from said zero current detecting unit, and configured to detect the output voltage across said output capacitor, said first control unit being operable to enable said rectification switch unit to operate in the ON state for a predetermined time period upon detecting that the output voltage is less than a predetermined target voltage and upon receipt of the zero current indication signal from said zero current detecting unit; and
a primary side control module including
a second control unit coupled to said second primary winding of said transformer, and configured to detect a potential at said non-dot terminal of said second primary winding of said transformer and a current flowing through said first primary winding of said transformer, and a switching unit coupled to said non-dot terminal of said first primary winding of said transformer and said second control unit, and being operable in one of an ON state and an OFF state in response to a control voltage from said second control unit;

wherein said second control unit of said primary side control module is operable to
enable said switching unit to operate in the ON state upon detecting, based on the potential at said non-dot terminal of said second primary winding, one of a condition that the output voltage is less than a predetermined start voltage and the current flowing through said secondary winding of said transformer becomes zero, and a condition that the output voltage is greater than the predetermined start voltage and less than the predetermined target voltage, and
enable said switching unit to operate in the OFF state upon detecting that the current flowing through said first primary winding of said transformer is greater than a predetermined target current.

14. The switching power converting apparatus of claim 13, wherein said rectification switch unit of said secondary side control module includes one of an N-type metal-oxide-semiconductor field effect transistor (MOSFET) and a P-type MOSFET.

15. The switching power converting apparatus of claim 13, wherein said first control unit of said secondary side control module includes
a voltage divider coupled in parallel to said output capacitor for dividing the output voltage across said output capacitor so as to output a divided voltage corresponding to the output voltage,
a comparator coupled to said voltage divider for comparing the divided voltage from said voltage divider with a reference voltage corresponding to the predetermined target voltage so as to output a comparison signal based on a comparison result of comparison thus made, and
a controller coupled to said rectification switch unit, said zero current detecting unit, and said comparator, configured to receive the zero current indication signal from said zero current detecting unit and the comparison signal from said comparator, and configured to control said rectification switch unit; and
wherein said controller of said first control unit of said secondary side control module is operable, based on the comparison signal, to enable said rectification switch unit to operate in the ON state for the predetermined time period when the comparison signal indicates that the divided voltage is less than the reference voltage while said controller receives the zero current indication signal from said zero current detecting unit.

16. The switching power converting apparatus of claim 15, wherein:
said dot-marked terminal of said secondary winding of said transformer is coupled to said rectification switch unit; and
said non-dot terminal of said secondary winding of said transformer is coupled to said output capacitor.

17. The switching power converting apparatus of claim 15, wherein:
said non-dot terminal of said secondary winding of said transformer is coupled to said rectification switch unit; and said dot-marked terminal of said secondary winding of said transformer is coupled to said output capacitor.

18. The switching power converting apparatus of claim 13, wherein said second control unit of said primary side control module includes:
- a voltage divider coupled in parallel to said second primary winding of said transformer for dividing a voltage thereacross so as to output an auxiliary divided voltage corresponding to the voltage across said second primary winding of said transformer;
- a resistor coupled between said switching unit and said dot-marked terminal of said second primary winding of said transformer;
- an amplifier having a non-inverting input terminal coupled to a common node between said switching unit and said resistor, an inverting input terminal adapted for receiving a reference voltage, and an output terminal for outputting a reset signal;
- an actuator coupled to said voltage divider for receiving the auxiliary divided voltage therefrom, and being operable to output a set signal based on the auxiliary divided voltage;
- an RS flip-flop having a reset terminal coupled to said output terminal of said amplifier for receiving the reset signal therefrom, a set terminal coupled to said actuator for receiving the set signal therefrom, and an output terminal for outputting a control signal; and
- a driver coupled to said output terminal of said RS flip-flop and said switching unit and receiving the control signal from said output terminal of said RS flip-flop, said driver being operable to generate the control voltage based on the control signal.

* * * * *